United States Patent
Yamamoto et al.

(10) Patent No.: US 9,699,792 B2
(45) Date of Patent: Jul. 4, 2017

(54) BASE STATION APPARATUS, MOBILE STATION APPARATUS AND CIRCUIT, AND CHANNEL SWITCHING METHOD

(71) Applicant: FUJITSU LIMITED, Kawasaki-shi, Kanagawa (JP)

(72) Inventors: Satoshi Yamamoto, Plano, TX (US); Daisuke Nitta, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/822,218

(22) Filed: Aug. 10, 2015

(65) Prior Publication Data

US 2015/0351090 A1 Dec. 3, 2015

Related U.S. Application Data

(63) Continuation of application No. PCT/JP2013/058135, filed on Mar. 21, 2013.

(51) Int. Cl.
*H04W 72/04* (2009.01)
*H04W 48/18* (2009.01)
(Continued)

(52) U.S. Cl.
CPC ......... *H04W 72/048* (2013.01); *H04W 48/18* (2013.01); *H04W 88/10* (2013.01); *H04W 92/12* (2013.01); *H04W 92/20* (2013.01)

(58) Field of Classification Search
CPC . H04L 27/2626; H04L 5/0053; H04L 45/308; H04L 45/38; H04L 45/123;
(Continued)

(56) References Cited

U.S. PATENT DOCUMENTS 6,757,270 B1* 6/2004 Kumar ................. H04W 52/12
370/342
2005/0249160 A1* 11/2005 Tomita .................... H04L 47/10
370/329
(Continued)

FOREIGN PATENT DOCUMENTS

JP   2009-515487   4/2009
JP   2010-154150   7/2010
(Continued)

OTHER PUBLICATIONS

International Search Report and Written Opinion of the International Searching Authority (Form PCT/ISA/210, Form PCT/ISA/237), mailed in connection with PCT/JP2013/058135 and mailed May 21, 2013 (7 pages).
(Continued)

*Primary Examiner* — Jung-Jen Liu
(74) *Attorney, Agent, or Firm* — Fujitsu Patent Center

(57) ABSTRACT

A base station apparatus including a plurality of communication units which communicate through a different plurality of communication channels with an upper layer apparatus of the base station apparatus, a base station information acquisition unit which acquires base station information relating to the state of the base station apparatus, a channel selection unit which selects any of the plurality of communication channels in accordance with base station information, and a channel switching unit which dynamically switches the channel which is used for transmission of traffic of the mobile station apparatus to a channel which is selected by the channel selection unit.

11 Claims, 18 Drawing Sheets

(51) Int. Cl.
*H04W 88/10* (2009.01)
*H04W 92/12* (2009.01)
*H04W 92/20* (2009.01)

(58) Field of Classification Search
CPC . H04W 74/006; H04W 72/042; H04W 72/04; H04W 72/14; H04W 8/26; H04W 52/0245; H04W 52/0216; H04W 76/022; H04W 28/16; H04W 84/045; H04W 36/0083; H04W 36/0055
See application file for complete search history.

(56) References Cited

U.S. PATENT DOCUMENTS

| | | | |
|---|---|---|---|
| 2007/0030809 A1* | 2/2007 | Dayama | H04W 28/08 370/237 |
| 2007/0104218 A1* | 5/2007 | Hassan | H04L 1/0025 370/465 |
| 2008/0273479 A1* | 11/2008 | Kwak | H04W 72/14 370/311 |
| 2010/0002637 A1* | 1/2010 | Huoviala | H04W 72/1247 370/329 |
| 2011/0164593 A1* | 7/2011 | Huet | H04W 36/0055 370/333 |
| 2011/0225319 A1* | 9/2011 | Aso | H04W 8/082 709/238 |
| 2012/0076027 A1* | 3/2012 | Akyildiz | H04L 41/5025 370/252 |
| 2012/0179810 A1* | 7/2012 | Contreras Delpiano | H04W 48/18 709/224 |
| 2014/0003380 A1* | 1/2014 | Han | H04L 1/1861 370/329 |
| 2015/0296440 A1* | 10/2015 | Forssell | H04W 48/08 370/329 |

FOREIGN PATENT DOCUMENTS

| | | |
|---|---|---|
| JP | 2011-171994 | 9/2011 |
| JP | 2011-182033 | 9/2011 |
| KR | 10-2006-0101362 | 9/2006 |
| WO | 2004/093393 | 10/2004 |
| WO | 2010/067569 | 6/2010 |
| WO | 2012/105881 A1 | 8/2012 |

OTHER PUBLICATIONS

KROA—Office Action of Korean Patent Application No. 10-2015-7024238 dated Mar. 11, 2016, with English translation of the Office Action. US2012/0179810 cited in KROA was previously submitted in the IDS filed on Mar. 11, 2016.
JPOA—Office Action of Japanese Patent Application No. 2015-506491 dated Jul. 12, 2016, with English translation of the Office Action. JP 2010-154150 cited in the JPOA was previously submitted in the IDS filed on Aug. 10, 2015.
EESR—The Extended European Search Report of European Patent Application No. 13878541.5 dated Feb. 19, 2016.

* cited by examiner

BASE STATION APPARATUS, MOBILE STATION APPARATUS AND CIRCUIT, AND CHANNEL SWITCHING METHOD

CROSS-REFERENCE TO RELATED APPLICATION

This application is a continuation application based on International Application PCT/JP 2013/058135, filed on Mar. 21, 2013, the contents being incorporated herein by reference.

FIELD

The embodiments discussed herein relate to a base station apparatus, mobile station apparatus, and channel switching method.

BACKGROUND

As art for remote control of a network to which mobile station apparatuses are connected, the ANDSF (Access Network Discovery and Selection Function) is known.

As related art, it is known to select a suitable path in accordance with the type of flow handled in communication with the other party in communication for a mobile node (for example, web flow, video flow, audio flow, and data flow). The flow information which the mobile node refers to may be information which is acquired from an ANDSF server using the ANDSF.

Known in the art is a call control system of a network comprised of a nonsecured access network of a plurality of femto cells constructing an overlay network and of a secured core network connected by secured channels for communication use. The call control system establishes communication paths through the overlay network or through the core network between user terminals located in the femto cells. The femto cells are provided with security judging means for judging if means for realizing secure communication of application data have been devised at the user terminal side based on the call connection request which is received from the user terminal. The femto cells are provided with means for selecting the core network as the path for the call connection message if no means have been devised for secure communication and for selecting whichever of the overlay network and core network which has the higher search speed if it has been devised.

RELATED ART

Patent Literature

PLT 1: International Publication Pamphlet No. WO 2010/067569
PLT 2: Japanese Laid-Open Patent Publication No. 2011-182033A If the efficiency of communication between a base station apparatus and its upper layer apparatus falls, it becomes a reason for the fall of the communication throughput of a mobile station apparatus.

SUMMARY

According to one aspect of an apparatus, there is provided a base station apparatus. The base station apparatus comprises a plurality of communication units which communicate with an upper layer apparatus of the base station apparatus through a different plurality of communication channels, a base station information acquisition unit which acquires base station information relating to the state of the base station apparatus, a channel selection unit which selects any of the plurality of communication channels in accordance with the base station information, and a channel switching unit which dynamically switches a channel which is used for transmission of traffic of a mobile station apparatus to a channel which is selected by the channel selection unit.

According to another aspect of an apparatus, there is provided a mobile station apparatus. The mobile station apparatus comprises a plurality of communication units which communicate with a base station apparatus through a plurality of wireless communication channels, a mobile station information acquisition unit which acquires mobile station information relating to the state of the mobile station apparatus, a channel designation information acquisition unit which receives, by any of the plurality of communication units, channel designation information which is transmitted from the base station apparatus by responding to the transmission of the mobile station information which has been transmitted by any of the plurality of communication units, and a channel switching part which dynamically switches the channel which is used for communication with the base station apparatus to a channel which is designated by the channel designation information.

The object and advantages of the invention will be realized and attained by means of the elements and combinations particularly pointed out in the appended claims. It is to be understood that both the foregoing general description and the following detailed description are exemplary and explanatory only and are not restrictive of the invention as claimed.

DESCRIPTION OF EMBODIMENTS

According to the apparatuses and method which are disclosed in this Description, the efficiency of communication between a base station apparatus and its upper layer apparatus is improved.

1. Configuration of Communication System

Figure 1:
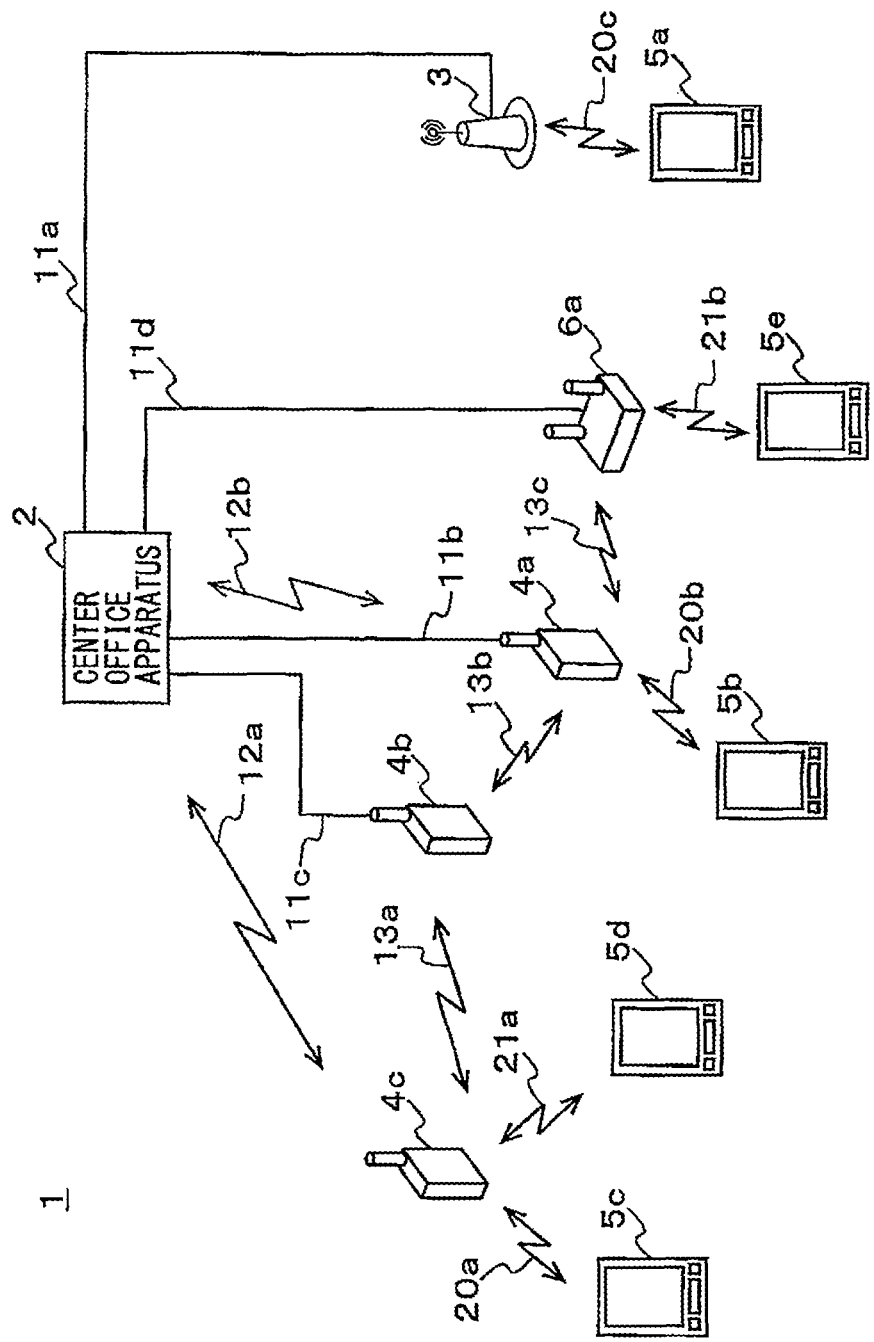
FIG. 1 is an explanatory view of an example of a configuration of a mobile communication system.

Below, preferred embodiments will be explained with reference to the attached drawings. FIG. 1 is an explanatory view of an example of the configuration of a mobile communication system. A mobile communication system 1 comprises a center office apparatus 2, macro base station apparatus 3, femto base station apparatuses 4a to 4c, and mobile station apparatuses 5a to 5e. In the following explanation and attached drawings, the femto base station apparatuses 4a to 4c and mobile station apparatuses 5a to 5e will sometimes be referred to all together as "femto base station apparatus 4" and "mobile station apparatus 5". Further, the base station apparatuses and mobile station apparatuses will sometimes be referred to respectively as "base stations" and "mobile stations".

The center office apparatus 2 is equipment which is installed in a center office which a mobile communication carrier of the mobile communication system 1 uses and performs the routines of the upper layer node apparatuses of the macro base stations 3 and femto base stations 4 in the mobile communication system 1. In the center office apparatus 2, termination processing of the mobile communication protocol and authentication processing of a mobile station 5 based on predetermined communication standards are executed. For example, when the mobile communication system 1 is based on the LTE (Long term Evolution) which is defined in the standards of the 3GPP (3rd Generation Partnership Project), the center office apparatus 2 may execute the operation of the EPC (Evolved Packet Core) node apparatus.

The center office apparatus 2 designates, to the mobile station 5, the communication channel which the mobile station 5 should use in accordance with predetermined conditions based on the traffic information of the communication channel which the center office apparatus 2 uses. For example, the center office apparatus 2 may execute the operation of the ANDSF server, and the mobile station 5, which operates as the ANDSF client, may switch the communication channel to be used in accordance with the designation from the center office apparatus 2.

The center office apparatus 2 designates the backhaul channel, which the femto base station 4 should use for communication with the center office apparatus 2, in accordance with predetermined conditions based on the traffic information of the communication channel which the center office apparatus 2 uses. For example, the center office apparatus 2 may execute the operation of the ANDSF server, and the femto base station 4, which operates as the ANDSF client, may switch the backhaul channel to be used in accordance with the designation from the center office apparatus 2. In the following explanation and attached drawings, the backhaul will sometimes be indicated as "BH".

The above processing of the center office apparatus 2 may be executed by a common information processing apparatus and may be executed by different information processing apparatuses disposed in the mobile communication system 1.

The macro base station 3 forms a relatively broad wireless communication area called a "macro cell" where it performs wireless communication with a mobile station 5a in the macro cell according to a predetermined communication standard based on a mobile communication wireless access system. The mobile communication wireless access system may, for example, be the WCDMA (Wideband Code Division Multiple Access)®, LTE, WiMAX (Worldwide Interoperability for Microwave Access), etc. In the following, for the mobile communication wireless access system on which the mobile station 5 is based, examples of the WCDMA® or other 3G (3rd Generation) system and LTE are used.

The communication channel of the mobile communication wireless access system may, for example, be a usage-based charging type channel where, as the fee for data transfer, a usage fee based on the usage time is charged. For example, the macro base station 3 and the mobile station 5a may communicate by an LTE based communication channel 20c. Further, the macro base station 3 and the center office apparatus 2 communicate through a fixed channel 11a.

A femto base station 4 forms a relatively small sized wireless communication area called a "femto cell" where it performs wireless communication with a mobile station 5 in the femto cell according to a predetermined communication standard based on wireless communication of a mobile communication wireless access system or wireless communication based on a system other than the mobile communication wireless access system. The system other than the mobile communication wireless access system may be, for example, a system based on a wireless LAN (Local Area Network) or near distance wireless communication standard.

One example of the communication standard of a wireless LAN may be, for example, the WiFi (Wireless Fidelity) which is prescribed by the IEEE (The Institute of Electrical and Electronic Engineers) 802.11. One example of the near distance wireless communication standard is the UWB (Ultra Wide Band) which is prescribed in IEEE 802.15.3a. In the following explanation, the example is used where the system other than a mobile communication wireless access system, which is used by the femto base station 4 for the wireless access channel with the mobile station 5, is the WiFi.

In the following explanation, the wireless communication channel between the femto base station 4 and the mobile station 5 will sometimes be indicated as a "wireless access channel". In the following embodiment, a wireless access channel includes a 3G channel, LTE channel, and WiFi channel.

For example, the femto base station 4a and the mobile station 5b may communicate by a communication channel 20b of an LTE system. The femto base station 4c and the mobile station 5c may communicate by a 3G communication channel 20a. The femto base station 4c and the mobile station 5d may communicate by a WiFi channel 21a.

The BH channel which can be used for communication between the femto base station 4 and the center office apparatus 2 may differ depending on the state of installation of the individual femto base stations 4. For example, the BH channel of the femto base station 4a may be the fixed channel 11b which connects the femto base station 4a and center office apparatus 2, the wireless channel 12b based on the mobile communication wireless access system, and ad hoc channels 13b and 13c.

The BH channel of the femto base station 4b may be a fixed channel 11c, which connects the femto base station 4b and the center office apparatus 2, and the ad hoc channels 13a and 13b. The BH channel between the femto base station 4c and the center office apparatus 2 may be the wireless channel 12a based on the mobile communication wireless access system and the ad hoc channel 13a.

The fixed channels 11b and 11c may, for example, include channels which utilize an FTTH (fiber to the home) or ADSL (asymmetric digital subscriber line). The fixed channels 11b and 11c may be fixed charging type fixed channels or may be usage-based charging type fixed channels or a plurality of channels which combine these. In the following explanation, the fixed channels 11a to 11c will sometimes be referred to together as the "fixed channel 11". The wireless channels 12a and 12b will sometimes be referred to together as the "wireless channel 12". The ad hoc channels 13a to 13c will sometimes be referred to all together as the "ad hoc channel 13".

An ad hoc channel 13 is a wireless LAN or a wireless channel between femto base stations 4 according to a near distance wireless communication standard. The mobile communication system 1 may be provided with a wireless access point 6a which communicates with a femto base station 4 through an ad hoc channel 13. The ad hoc channel 13 in the present embodiment may be a WiFi channel. In the following explanation and attached drawings, the wireless access point will sometimes to be indicated as "AP".

When the BH channel is an ad hoc channel 13, a femto base station 4 communicates with the center office apparatus 2 through the fixed channel 11 of another femto base station 4 which communicates through the ad hoc channel 13. Alternatively, a femto base station 4 communicates with the center office apparatus 2 through the fixed channel 11d of the AP 6a which communicates through the ad hoc channel 13.

For example, the femto base station 4c and the center office apparatus 2 may communicate through the ad hoc channel 13a, femto base station 4b, and fixed channel 11c. Further, for example, the femto base station 4b and the center office apparatus 2 may communicate through the ad hoc channel 13a, femto base station 4c, and wireless channel 12a. Further, for example, the base station 4a and the center office apparatus 2 may communicate through the ad hoc channel 13c, AP 6a, and fixed channel 11d. Note that, in the following explanation, the example is used where the communication channel which is used for the ad hoc channel is a WiFi channel.

The mobile station 5e may communicate with the center office apparatus 2 through the WiFi channel 21b connecting with the AP 6a and the fixed channel 11d between the AP 6a and center office apparatus 2.

A femto base station 4 acquires information relating to the femto base station 4 such as the state of load at the femto base station 4, effective throughput, available BH channels, etc. The femto base station 4 generates policy information which includes this acquired information. The femto base station 4 generates policy information with other femto base stations 4.

A mobile station 5 acquires information relating to itself, such as user type information of the mobile station 5, application information for transmitting and/or receiving traffic, the position of the mobile station 5, and other information. The mobile station 5 generates policy information including this acquired information. The mobile station 5 generates policy information with the femto base station 4.

The femto base station 4 dynamically switches the BH channel which transmits traffic of the mobile station 5 based on the information included in the policy information which the femto base station 4 generates and the policy information which is received from another femto base station 4 and/or mobile station 5. Further, the femto base station 4 dynamically designates the wireless access channel between the mobile station 5 and the femto base station 4, based on the information included in the policy information, which the femto base station 4 generates, and/or the policy information which is received from the mobile station 5. For example, the femto base station 4 may operate as an ANDSF server, while the mobile station 5, which operates as an ANDSF client, may dynamically switch the wireless access channel to be used in accordance with the designation from the femto base station 4.

2. Functional Configuration

Figure 2:
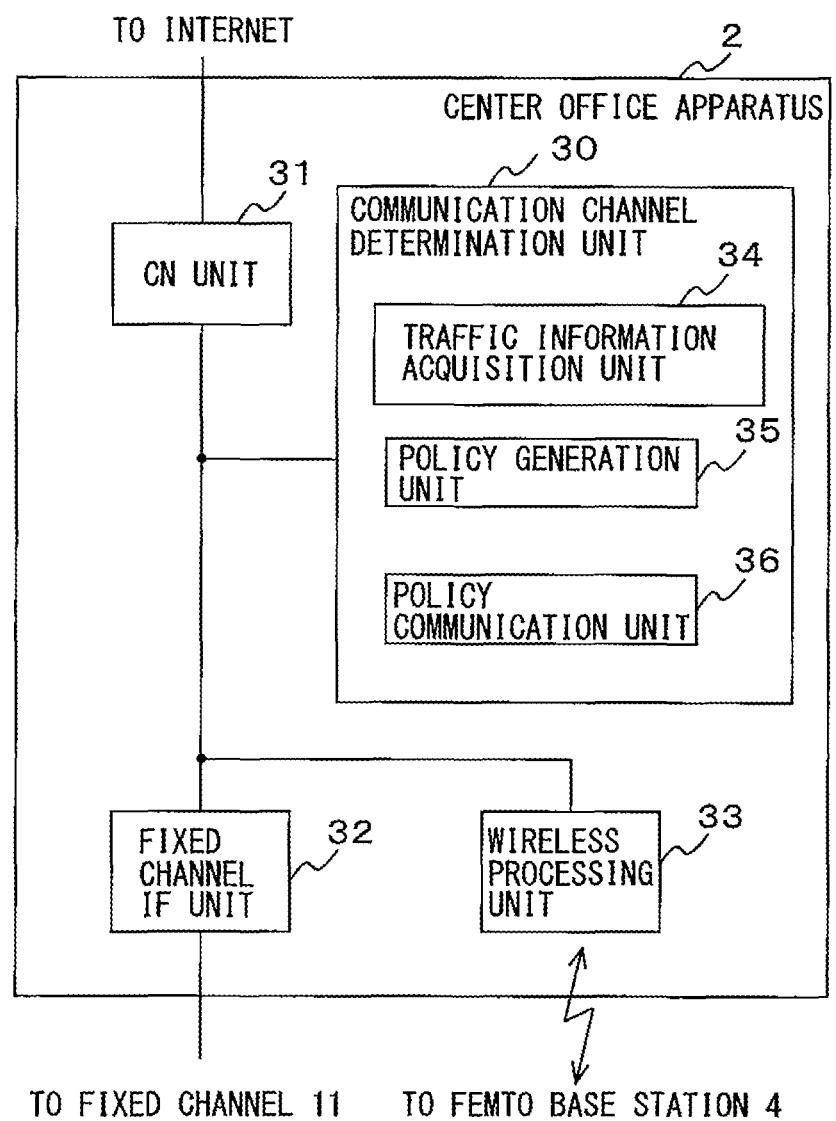
FIG. 2 is a view of a functional configuration of one example of a center office apparatus.

The functions of the respective component elements of the mobile communication system 1 will be explained. FIG. 2 is a view of the functional configuration of one example of the center office apparatus 2. The center office apparatus 2 comprises a communication channel determination unit 30, core network unit 31, fixed channel interface unit 32, and wireless processing unit 33. In the following explanation and attached drawings, the core network and interface will sometimes be respectively indicated as "CN" and "IF".

The communication channel determination unit 30 determines the communication channel which the mobile station 5 uses and the BH channel between the femto base station 4 and the center office apparatus 2. For example, the communication channel determination unit 30 operates as an ANDSF server and determines the communication channel used by the mobile station 5, which operates as an ANDSF client, and the BH channel between the femto base station 4 which operates as the ANDSF client.

The communication channel determination unit 30 comprises a traffic information acquisition unit 34, policy generation unit 35, and policy communication unit 36. The traffic information acquisition unit 34 acquires traffic information of the communication channel which the center office apparatus 2 uses. The policy generation unit 35 determines the used communication channel of the mobile station 5 in accordance with predetermined conditions based on the traffic information.

The policy generation unit 35 determines, for example, as the used communication channel of the mobile station 5 in the macro cell, either a 3G channel or LTE channel of wireless channels based on the mobile communication wireless access system, which the mobile station 5 is based on. The policy generation unit 35 determines, for example, as the used communication channel of the mobile station 5 in the femto cell, either of the above wireless access channels. The policy generation unit 35 generates communication channel designation information which designates the communication channel used by the mobile station 5.

The policy generation unit 35 determines the BH channel between the center office apparatus 2 and the femto base station 4 in accordance with predetermined conditions based on the traffic information. The policy generation unit 35 generates communication channel designation information which designates the BH channel.

The policy communication unit 36 transmits the communication channel designation information to the mobile station 5 and femto base station 4. The mobile station 5 switches the communication channel to be used to the communication channel which is designated by the communication channel designation information. The femto base station 4 switches the BH channel to be used to the channel which is designated by the communication channel designation information.

The CN unit 31 performs the operation of the upper layer node apparatus of the macro base station 3 and femto base station 4 in the mobile communication system 1. The CN unit 31 performs a terminating processing of the mobile communication protocol in accordance with a predetermined communication standard and authentication processing for the mobile station 5. For example, when the mobile communication system 1 is based on the LTE, the CN unit 31 may be an EPC node device.

The fixed channel IF unit 32 is an interface which connects the macro base station 3 and femto base station 4 through the fixed channel 11. The wireless processing unit 33 performs wireless communication with the femto cell base station 4 through the wireless channel 12 based on the mobile communication wireless access system.

Figure 3:
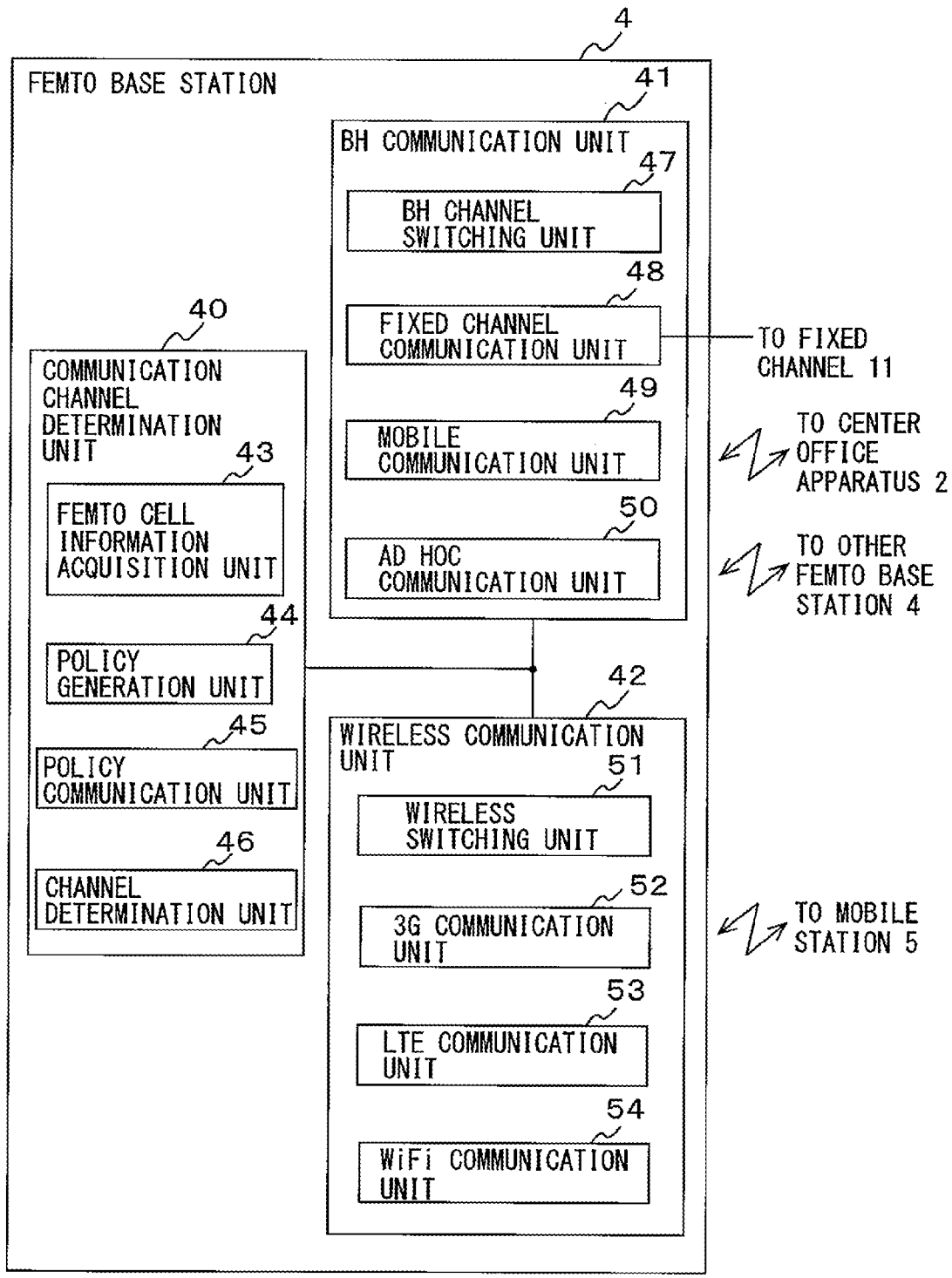
FIG. 3 is a view of a functional configuration of one example of a femto base station apparatus.

FIG. 3 is a view of the functional configuration of one example of a femto base station 4. The femto base station 4 comprises a communication channel determination unit 40, BH communication unit 41, and wireless communication unit 42.

The communication channel determination unit 40 determines the BH channel between the femto base station 4 and the center office apparatus 2. Further, the communication channel determination unit 40 determines the wireless access channel between the femto base station 4 and the mobile station 5. For example, the communication channel determination unit 40 may operate as an ANDSF server and determine a communication channel to be used by the mobile station 5 which operates as the ANDSF client.

Further, the communication channel determination unit 40 receives the communication channel designation information which is transmitted from the center office apparatus 2. For example, the communication channel determination unit 40 operates as an ANDSF client and receives communication channel designation information from the center office apparatus 2, which operates as the ANDSF server, and switches the used BH channel. The communication channel determination unit 40 comprises a femto cell information acquisition unit 43, policy generation unit 44, policy communication unit 45, and channel determination unit 46.

The femto cell information acquisition unit 43 acquires information relating to the femto base station 4 which the femto base station 4 holds. For example, the femto cell information acquisition unit 43 may acquire the following information (1) to (11).
(1) Information relating to the resources used by the femto base station 4, for example, the number of users which are connected to a femto cell.
(2) Information relating to the resources used by each BH channel and the resources used by the wireless access channel, for example, a channel usage rate and a channel usage rate of a wireless access channel.
(3) Performance throughput values of BH channels and performance throughput values of wireless access channels.
(4) Other femto base stations 4 positioned at surroundings.
(5) Position of femto base station 4 and position of other femto base stations 4.
(6) User type information of mobile station 5 which is connected.
(7) Application information for transmission and/or reception of traffic by the mobile station 5 which is connected.
(8) Current time.
(9) Available BH channels.
(10) Type of charging of BH channels.
(11) AP information.

Note that, as the effective throughput value described in the above (3), for example, an actual throughput may be used, by taking the interference incurred in wireless communication or the bit error rate into consideration. Further, the user type information which is described in the above (6) may, for example, be information which designates the order among users.

The user type information may, for example, be information which designates the priority degree. In the present embodiment, the user type information may be a variable which has a value "premier user" which designates a user with a relatively high priority order and a value "economy" which designates a user with a relatively low priority order.

The AP information which is described in the above (11) is, for example, information which indicates the existence of the AP which the femto base station 4 can communicate with through the ad hoc channel 13.

The policy generation unit 44 generates policy information which includes information (1) to (11). The policy communication unit 45 transmits policy information which the policy generation unit 44 generates to another femto base station 4. Further, the policy communication unit 45 receives the policy information, which is generated at the other femto base station 4, from the other femto base station 4. Further, the policy communication unit 45 receives the policy information which is generated at the mobile station 5. Further, the policy communication unit 45 receives the communication channel designation information which was transmitted from the center office apparatus 2.

The channel determination unit 46 determines the BH channel which is used for transmission of traffic of the mobile station 5, based on the information which is included in the policy information, which the policy generation unit 44 generates, and policy information received from the other femto base station 4 and/or mobile station 5. The BH channel determination operation, by which the channel determination unit 46 determines the BH channel, will be further explained in the later mentioned "3.1. BH Channel Determination Operation".

The channel determination unit 46 determines the wireless access channel between the mobile station 5 and the femto base station 4, based on the information included in the policy information, which the femto base station 4 generated, and policy information which is received from the mobile station 5. The wireless access channel determination operation by which the channel determination unit 46 determines the wireless access channel will be further explained at the later mentioned "3.2. Wireless Access Channel Determination Operation".

The acquisition of information by the femto cell information acquisition unit 43, the generation of policy information by the policy generation unit 44, and the transmission of policy information by the policy communication unit 45, may be performed periodically or at the time of generation of a trigger. Similarly, the BH channel determination operation and wireless access channel determination operation by the channel determination unit 46, may be performed periodically or at the time of generation of a trigger.

The trigger may, for example, be generated in accordance with the state of the femto base station 4. For example, the trigger may be generated in accordance with a change in the load of the femto base station 4, a change in the used resources by the femto base station 4, a change in the used resources by the BH channel of the femto base station 4, or a change in the used resources by the wireless access channel of the femto base station 4. A trigger may also be generated when detecting a new mobile station 5. A trigger may also be generated when receiving policy information from another femto base station 4 or mobile station 5.

The policy generation unit 44 generates the communication channel designation information which designates the wireless access channel which the channel determination unit 46 determined. The policy communication unit 45 transmits the communication channel designation information, which the policy generation unit 44 generated, to the mobile station 5.

The BH communication unit 41 communicates with the center office 2 through any of the BH channels which the femto base station 4 can use. The BH communication unit 41 comprises a BH channel switching unit 47, fixed channel communication unit 48, mobile communication unit 49, and ad hoc communication unit 50.

The BH channel switching unit 47 switches the BH channel, which transmits the traffic of the mobile station 5, in accordance with the communication channel designation information which is transmitted from the center office apparatus 2. Further, the BH channel switching unit 47 dynamically switches the BH channel, which transmits the traffic of the mobile station 5, to the BH channel which the channel determination unit 46 determined.

The fixed channel communication unit 48 communicates with the center office apparatus 2 to transmit the traffic of the mobile station 5 through the fixed channel 11. Further, the fixed channel communication unit 48 detects a faulty channel which occurs in the fixed channel 11.

The mobile communication unit 49 communicates with the center office apparatus 2 to transmit the traffic of the mobile station 5 through the fixed channel 12. The ad hoc communication unit 50 communicates with the center office apparatus 2 to transmit the traffic of the mobile station 5 through the ad hoc channel 13.

The BH channel switching unit 47 switches which of the fixed channel communication unit 48, mobile communication unit 49, and ad hoc communication unit 50 to use to transmit the traffic of the mobile station 5 so as to switch the BH channel which transmits the traffic of the mobile station 5.

The wireless communication unit 42 communicates with the mobile station 5 through any of the wireless access channels. The wireless communication unit 42 comprises a wireless switching unit 51, 3G communication unit 52, LTE communication unit 53, and WiFi communication unit 54.

The wireless switching unit 51 switches the wireless access channel between the femto base station 4 and the mobile station 5 to the wireless access channel which the channel determination unit 46 determined. The 3G communication unit 52 uses the 3G communication control rules as the basis for wireless communication between the femto base station 4 and the mobile station 5. The LTE communication unit 53 uses the LTE communication control rules as the basis for wireless communication between the femto base station 4 and the mobile station 5.

The WiFi communication unit 54 uses the WiFi communication control rules as the basis for wireless communication between the femto base station 4 and the mobile station 5. Further, the WiFi communication unit 54 uses the WiFi communication control rules as the basis for wireless communication with the femto base station 4 through the ad hoc channel 13 and wireless communication between the femto base station 4 and AP 6a through the ad hoc channel 13.

When the policy communication unit 45 transmits the policy information, the policy communication unit 45 may broadcast the policy information to be transmitted to the WiFi communication unit 54. When the WiFi communication unit 54 receives policy information which was broadcast from another femto base station 4, it may transfer the received policy information to the policy communication unit 45.

The wireless switching unit 51 may switch any of the 3G communication unit 52, LTE communication unit 53, and WiFi communication unit 54 for use for the wireless access channel between the femto base station 4 and the mobile station 5 so as to switch the wireless access channel between the femto base station 4 and the mobile station 5.

Figure 4:
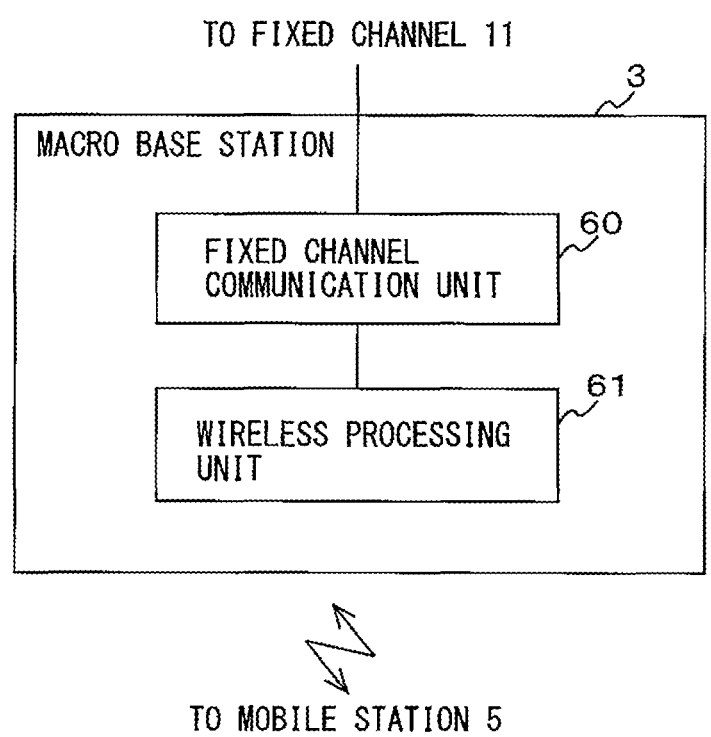
FIG. 4 is a view of the functional configuration of one example of a macro base station apparatus.

FIG. 4 is a view of the functional configuration of one example of a macro base station 3. The macro base station 3 is comprised of a fixed channel communication unit 60 and a wireless processing unit 61. The fixed channel communication unit 60 communicates with the center office apparatus 2 to transmit the traffic of the mobile station 5 through the fixed channel 11a. The wireless processing unit 61 performs wireless communication with the mobile station 5 based on the mobile communication wireless access system in accordance with predetermined communication rules.

Figure 5:
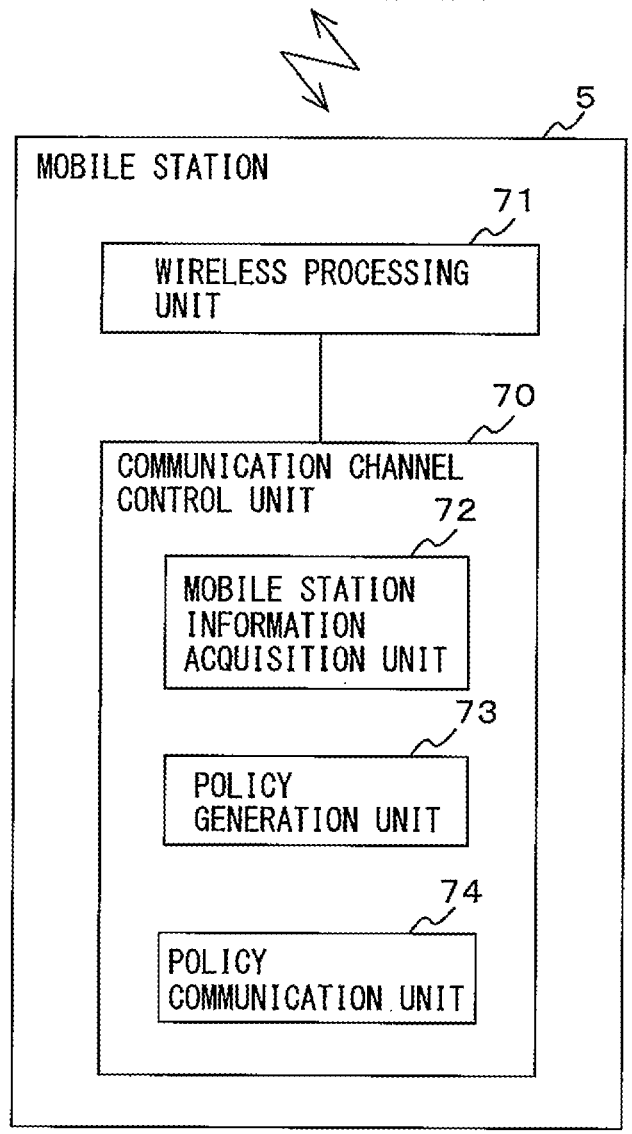
FIG. 5 is a view of a functional configuration of one example of a mobile station apparatus.

FIG. 5 is a view of the functional configuration of one example of a mobile station 5. The mobile station 5 is a communication apparatus which is used when communicating through the Internet or when communicating voice or digital data etc. through a public network and/or mobile communication network. The mobile station 5 may be a communication apparatus which can operate as an ANDSF client. The mobile station 5 may receive communication channel designation information such as the policy transmitted from the ANDSF server and switch the wireless access channel. When the mobile station 5 receives the communication channel designation information, it is also possible to, for example, detect the time of suspending wireless communication or time of switching the content to be transmitted or to be received and switch the wireless access channel at these timings.

The mobile station 5 comprises a communication channel control unit 70 and a wireless processing unit 71. The communication channel control unit 70 sets the usage channel of wireless communication between the mobile station 5 and the macro base station 3 in accordance with the communication channel designation information which was transmitted from the center office apparatus 2. Further, the communication channel control unit 70 dynamically switches the wireless access channel between the mobile station 5 and the femto base station 4 in accordance with the communication channel designation information which is transmitted from the femto base station 4.

The communication channel control unit 70 comprises a mobile station information acquisition unit 72, policy generation unit 73, and policy communication unit 74.

The mobile station information acquisition unit 72 acquires information relating to the mobile station 5 held by the mobile station 5. The mobile station information acquisition unit 72 may, for example, acquire the following information (1) to (6).
(1) Position of mobile station 5
(2) Current time
(3) User type information of mobile station 5
(4) Application information which transmits and/or receives traffic
(5) Available wireless communication system
(6) Currently used wireless communication channel.

Note that, the user type information, which is described in the above (3), may for example be information which designates the order among users. The user type information may, for example, be information which designates the priority order. In the present embodiment, the user type information may be a variable having a value "premier user" which designates a user with a relatively high priority order and a value "economy" which designates a user with a relatively low priority order.

The wireless communication system, which is described in the above (5), may be a wireless communication system of a system other than the mobile communication wireless access system which the mobile station 5 is based on and a mobile communication wireless access system which the mobile station 5 can use. For example, in the present embodiment, the wireless communication system, which is described in the above (5), is a 3G system, LTE system, and WiFi system.

The currently used wireless communication channel, which is described in the above (6), is any of the communication channels of the mobile communication wireless access systems which a mobile station 5 in the macro cell can use or any of the wireless access channels which a mobile station 5 in the femto cell can use. For example, in the present embodiment, the currently used wireless communication channel, which is described in the above (6), is any of 3G channel, LTE channel, and WiFi channel.

The policy generation unit 73 generates policy information including the information (1) to (6). The policy communication unit 74 transmits the policy information, which the policy generation unit 44 generates, to the femto base station 4.

The acquisition of information by the mobile station information acquisition unit 72, the generation of policy information by the policy generation unit 73, and the transmission of policy information by the policy communication unit 74, may be performed periodically or at the time of generation of a trigger.

The trigger may be generated when, for example, the destination femto base station 4 changes. For example, a trigger may be generated when receiving policy information from the femto base station 4.

Further, the policy communication unit 74 receives communication channel designation information which is transmitted from the center office apparatus 2 and femto base station 4. The communication channel designation information may, for example, also be transmitted by an SMS (Short Message Service) from the center office apparatus 2 and femto base station 4.

The wireless processing unit 71 communicates with the macro base station 3 through any of the wireless channels based on the mobile communication wireless access systems which the mobile station 5 can use, when a mobile station 5 is positioned in the macro cell. The wireless processing unit 71 may be provided with a plurality of communication units which communicate based on mobile communication wireless access systems which a mobile station 5 can use. The communication channel control unit 70 sets the communication channel with the macro base station 3 in accordance with the communication channel designation information which is transmitted from the center office apparatus 2.

The wireless processing unit 71 communicates with the femto base station 4 through any of the wireless access channels which can be used between the mobile station 5 and the femto base station 4, when a mobile station 5 is positioned in the femto cell. The communication channel control unit 70 sets the wireless access channel between the mobile station 5 and the femto base station 4 in accordance with the communication channel designation information which was transmitted from the center office apparatus 2. The communication channel control unit 70 dynamically switch the wireless access channel between the mobile station 5 and the femto base station 4, in accordance with the communication channel designation information which was transmitted from a femto base station 4.

3. Explanation of Operation

Next, the operations of the component elements of the mobile communication system 1 will be explained.

3.1. BH Channel Determination Operation

The channel determination unit 46, which is illustrated in FIG. 3, determines the BH channel which is used for transmission of the traffic of the mobile station 5, based on the information included in the policy information which the policy generation unit 44 generated and the policy information received from another femto base station 4 and/or a mobile station 5.

At the BH channel determination operation, the channel determination unit 46 determines an indicator of the available resources of other femto base station 4, based on, for example, the policy information of this other femto base station 4. The channel determination unit 46 may, for example, determine an indicator $\alpha$ of the available resources for the other femto base station 4 in accordance with the following formula (1).

$$\alpha = \text{(Allowable maximum number of users of other femto base station 4} - \text{Current number of connected users of present femto base station 4)} / \text{(Allowable maximum number of users of other femto base station 4)} \quad (1)$$

Further, at the BH channel determination operation, the channel determination unit 46 may, for example, determine an indicator, which predicts the throughput which can be allocated to the BH channel, for each BH channel as an "allocated throughput prediction indicator". The channel determination unit 46 may, for example, determine the allocated throughput prediction indicator $\alpha'$ in accordance with the following formula (2).

$$\alpha' = \text{Effective throughput of BH channel} \times \text{(Allowable maximum number of users of present femto base station 4} - \text{Current number of connected users of present femto base station 4)} / \text{(Allowable maximum number of users of present femto base station 4)} \quad (2)$$

The channel determination unit 46 determines the BH channel which is used for transmission of traffic of the mobile station 5, in accordance with a predetermined policy determined in accordance with the available BH channels.

An example of the policy of a femto base station 4 which can use the fixed channel 11 and ad hoc channel 13, will be shown below.

(A1) When receiving policy information from another femto base station 4 and the indicator $\alpha$ of the available resources determined for the other femto base station 4 is larger than 0, an ad hoc channel is determined as the BH channel. If the indicator α is 0, a fixed channel 11 is determined as the BH channel.

(A2) If the current time is in a predetermined time frame, the fixed channel 11 is determined as the BH channel. The predetermined time frame may be for example 11:00 to 13:00 and 18:00 to 24:00. If the current time is in another time frame, an ad hoc channel is determined as the BH channel.

(A3) When the fixed channel communication unit 48 detects a faulty channel of the fixed channel 11, the channel determination unit 46 determines an ad hoc channel 13 as the BH channel.

An example of the policy of the femto base station 4 which can use a wireless channel 12 and an ad hoc channel 13, will be shown below.

(B1) When the type of user of the mobile station 5 is a premier user, and the application transmitted and/or received by the mobile station 5 is a predetermined application, a mobile channel is determined as the BH channel. The predetermined application is, for example, the VoIP (Voice Over Internet Protocol) or VoLTE (Voice Over LTE). In other cases, an ad hoc channel 13 is determined as the BH channel.

(B2) When the type of user of the mobile station 5 is a premier user, a wireless channel 12 is preferentially determined as the BH channel. When the type of user of the mobile station 5 is an economy user, an ad hoc channel 13 is determined as the BH channel.

(B3) When the current time is in a predetermined time frame and the type of user of the mobile station 5 is an economy user, an ad hoc channel 13 is determined as the BH channel. For example, the predetermined time frame may for example be 24:00 to 6:00. When the current time is another time frame or the type of user of the mobile station 5 is a premier user, a wireless channel 12 is determined as the BH channel.

For example, an example of the policy of the femto base station 4a which can use a fixed channel 11, wireless channel 12, and ad hoc channel 13, will be shown below.

(C1) In principle, a fixed channel 11 is determined as the BH channel.

(C2) If the user of the mobile station 5 is a premier user, a wireless channel 12 is determined as the BH channel.

(C3) If the allocated throughput prediction indicator α' of a wireless channel 12 is larger than the indicator α' of a fixed channel 11, a wireless channel 12 is determined as the BH channel.

(C4) If the fixed channel communication unit 48 detects a faulty channel of a fixed channel 11 and the user of a mobile station 5 is a premier user, the channel determination unit 46 determines a wireless channel 12 or an ad hoc channel 13 as the BH channel. In this case, the channel determination unit 46 determines the wireless channel 12 as the BH channel preferentially over the ad hoc channel 13.

(C5) If the fixed channel communication unit 48 detects a faulty channel of a fixed channel 11 and the user of a mobile station 5 is a premier user, the channel determination unit 46 determines an ad hoc channel 13 as the BH channel.

Figure 6:
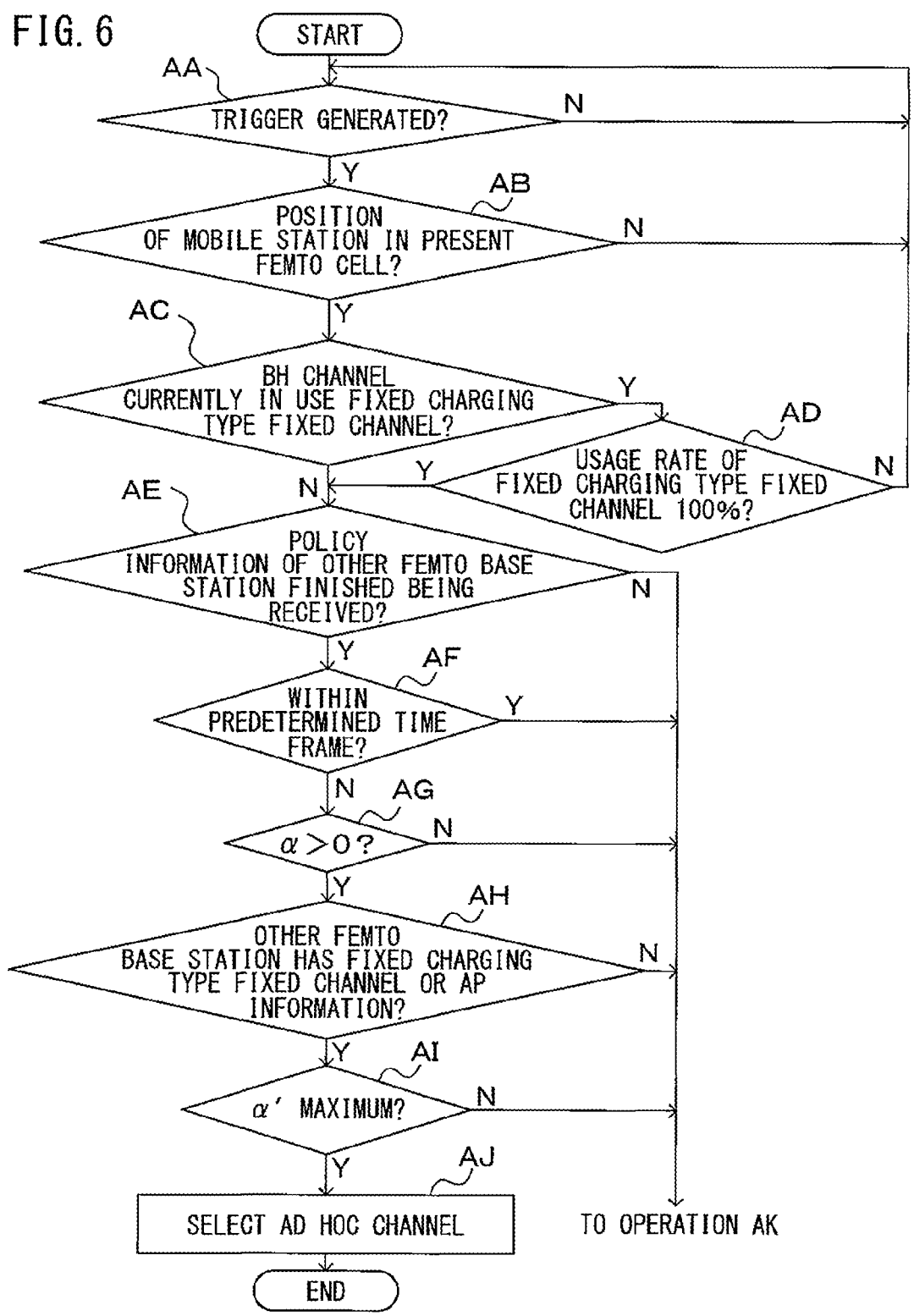
FIG. 6 is an explanatory view of one example of a backhaul channel determination operation (unit 1).
Figure 7:
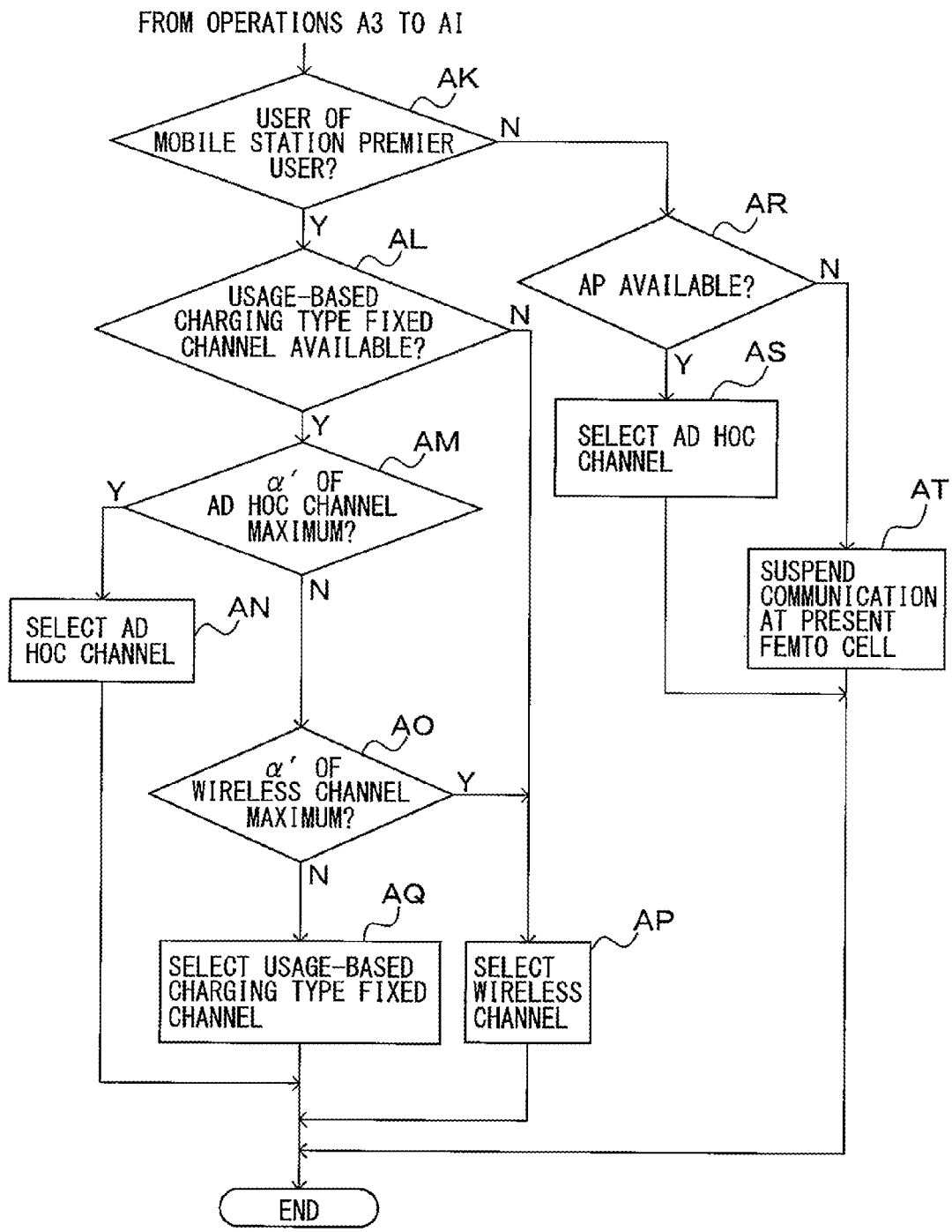
FIG. 7 is an explanatory view of one example of a backhaul channel determination operation (unit 2).

Next, a first example of the BH channel determination operation by the femto base station 4 will be explained. FIG. 6 and FIG. 7 are explanatory views of a first example of the BH channel determination operation. The operation of FIG. 6 and FIG. 7 is an example of the BH channel determination operation by the femto base station 4 which can use a fixed channel 11, wireless channel 12, and ad hoc channel 13.

At the operation AA, the channel determination unit 46 judges if a trigger for starting a BH channel determination operation, has been generated when a trigger is generated (operation AA: Y), the routine proceeds to the operation AB. When no trigger is generated (operation AA: N), the routine returns to the operation AA. In this case, the BH channel is not switched.

At the operation AB, the channel determination unit 46 judges if there is a mobile station 5 inside the femto cell which the femto base station 4 forms. If there is a mobile station 5 inside of the femto cell (operation AB: Y), the routine proceeds to the operation AC. If there is no mobile station 5 in the femto cell (operation AB: N), the routine returns to the operation AA. In this case, the BH channel is not switched.

At the operation AC, the channel determination unit 46 judges if the BH channel, which is currently used for transmission of the traffic of the mobile station 5, is a fixed charging type fixed channel. When the BH channel is a fixed charging type fixed channel (operation AC: Y), the routine proceeds to the operation AD. If the BH channel is not a fixed charging type fixed channel (operation AC: N), the routine proceeds to the operation AE.

At the operation AD, the channel determination unit 46 judges if the channel usage rate of the fixed charging type fixed channel is 100%. When the channel usage rate of the fixed charging type fixed channel is 100% (operation AD: Y), the routine proceeds to the operation AE. When the channel usage rate of the fixed charging type fixed channel is not 100% (operation AD: N), the routine returns to operation AA. In this case, the BH channel is not switched and the BH channel remains as a fixed charging type fixed channel.

At the operation AE, the channel determination unit 46 judges if it is receiving policy information from another femto base station 4 through an ad hoc channel 13. When policy information from the other femto base station 4 finishes being received (operation AE: Y), the routine proceeds to the operation AF. When policy information, from the other femto base station 4, has not finished being received (operation AE: N), the routine proceeds to the operation AK.

At the operation AF, the channel determination unit 46 judges if the current time is within a predetermined time frame. When the current time is within the predetermined time (operation AF: Y), the routine proceeds to the operation AK. If the current time is not in the predetermined time frame (operation AF: N), the routine proceeds to the operation AG.

At the operation AG, the channel determination unit 46 judges if the indicator α of the available resources for the other femto base station 4, which was calculated based on the policy information of the other femto base station 4, is larger than 0. If the indicator α is larger than 0 (operation AG: Y), the routine proceeds to the operation AH. If the indicator α is 0 (operation AG: N), the routine proceeds to the operation AK.

At the operation AH, the channel determination unit 46 judges if the other femto base station 4 has a fixed charging type fixed channel or AP information. When the femto base station 4 has the fixed charging type fixed channel or AP information (operation AH: Y), the routine proceeds to the operation AI. When the other femto base station 4 does not have either of the fixed charging type fixed channel and AP information (operation AH: N), the routine proceeds to the operation AK.

At the operation AI, the channel determination unit 46 judges if the allocated throughput prediction indicator α' of the ad hoc channel 13 is the maximum among the BH channels which the femto base station 4 can use. When the allocated throughput prediction indicator α' of the ad hoc channel 13 is the maximum (operation AI: Y), the routine proceeds to the operation AJ. When the allocated throughput prediction indicator α' of the ad hoc channel 13 is not the maximum (operation AI: N), the routine proceeds to the operation AK.

At the operation AJ, the channel determination unit 46 selects the ad hoc channel 13 as the BH channel. After that, the BH channel determination operation ends.

At the operation AK, the channel determination unit 46 judges if the user of the mobile station 5 is a premier user. If the user is a premier user (operation AK: Y), the routine proceeds to the operation AL. If the user is not a premier user (operation AK: N), the routine proceeds to the operation AR.

At the operation AL, the channel determination unit 46 judges if there is a usage-based charging type fixed channel which can be used as the BH channel. When there is a usage-based charging type fixed channel which can be used as the BH channel (operation AL: Y), the routine proceeds to the operation AM. When there is no usage-based charging type fixed channel which can be used as the BH channel (operation AL: N), the routine proceeds to the operation AP.

At the operation AM, the channel determination unit 46 judges if the allocated throughput prediction indicator α' of the ad hoc channel 13 is the maximum among the BH channels which the femto base station 4 can use. When the allocated throughput prediction indicator α' of the ad hoc channel 13 is the maximum (operation AM: Y), the routine proceeds to the operation AN. When the allocated throughput prediction indicator α' of the ad hoc channel 13 is not the maximum (operation AM: N), the routine proceeds to the operation AO.

At the operation AN, the channel determination unit 46 selects the ad hoc channel 13 as the BH channel. After that, the BH channel determination operation ends.

At the operation AO, the channel determination unit 46 judges if the allocated throughput prediction indicator α' of the wireless channel 12 is the maximum among the BH channels which the femto base station 4 can use. When the allocated throughput prediction indicator α' of the wireless channel 12 is the maximum (operation AO: Y), the routine proceeds to the operation AP. If the allocated throughput prediction indicator α' of the wireless channel 12 is not the maximum (operation AO: N), the routine proceeds to the operation AQ.

At the operation AP, the channel determination unit 46 selects the wireless channel 12 as the BH channel. After that, the BH channel determination operation ends. At the operation AQ, the channel determination unit 46 selects a usage-based charging type fixed channel as the BH channel. After that, the BH channel determination operation ends.

At the operation AR, the channel determination unit 46 judges if there is an AP which communicates directly with the femto base station 4 through the ad hoc channel 13. If there is an AP (operation AR: Y), the routine proceeds to the operation AS. If there is no AP (operation AR: N), the routine proceeds to the operation AT.

At the operation AS, the channel determination unit 46 selects the ad hoc channel 13 as the BH channel. After that, the BH channel determination operation ends. At the operation AT, the channel determination unit 46 suspends the communication with the mobile station 5 at the present femto base station 4. After that, the BH channel determination operation ends.

Figure 8:
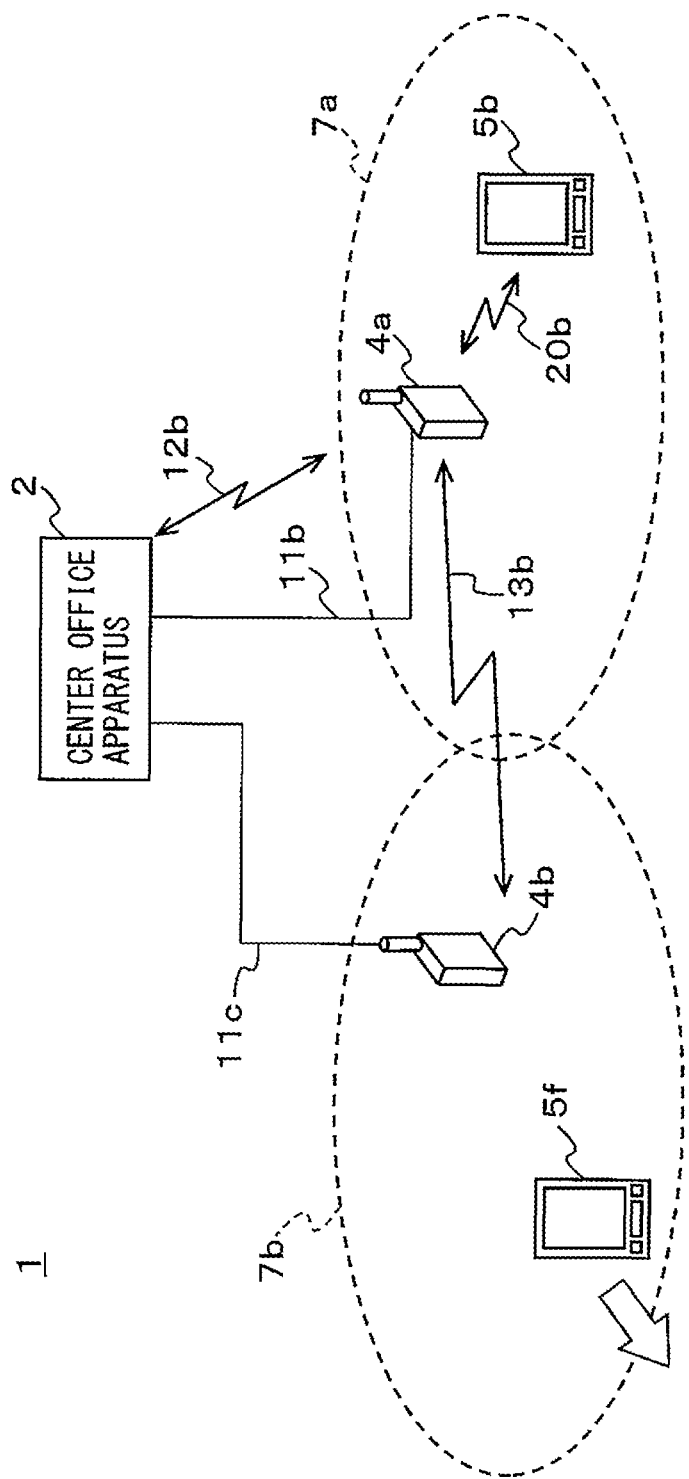
FIG. 8 is a schematic view of one example of the state of a backhaul channel determination operation being performed.
Figure 9:
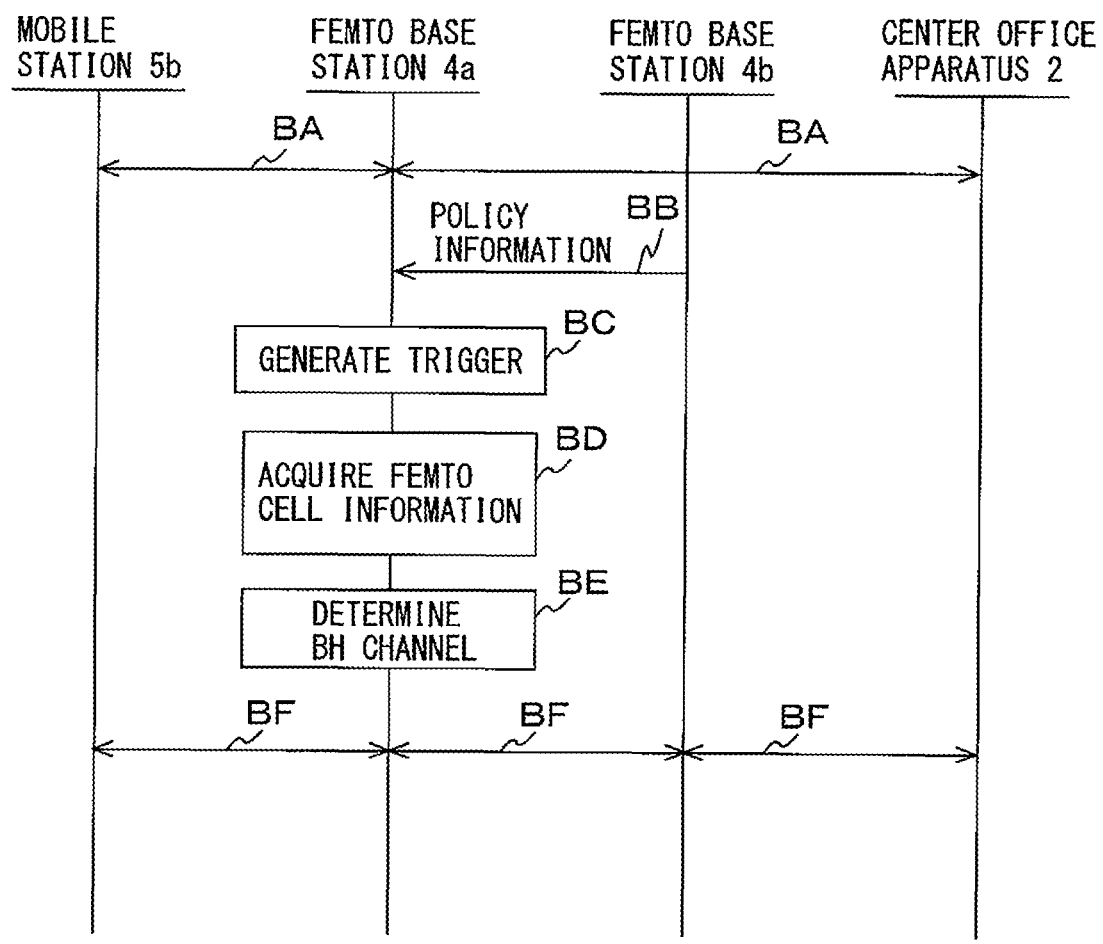
FIG. 9 is an explanatory view of one example of a sequence of a channel determination operation.

Next, the sequence of the BH channel determination operation will be explained. FIG. 8 is a schematic view of one example of the state where the BH channel determination operation is performed. FIG. 9 is an explanatory view of one example of the sequence of a BH channel determination operation.

Now, envision the case where the mobile station 5*f* is present in a femto cell 7*b* which the femto base station 4*b* forms. The number of users which are connected to the femto base station 4*b* is the allowable maximum number of users.

Further, the mobile station 5*b* is present in a femto cell 7*a* which the femto base station 4*a* forms. At the operation BA, the femto base station 4*a* transmits the traffic of the mobile station 5*b* with the center office apparatus 2 through the fixed channel 11*b*. The routine of the operation BA corresponds to operation performed by the wireless processing unit 71 of the mobile station 5, the wireless communication unit 42 and fixed channel communication unit 48 of the femto base station 4*a*, and the fixed channel IF unit 32 of the center office apparatus 2. Note that, the femto base station 4*a* can use a usage-based charging type wireless channel 12*b* or ad hoc channel 13*b* as the BH channel, as well.

If the mobile station 5*f* moves to the outside of the femto cell formed by the femto base station 4*b*, there is an extra margin in the number of connected users of the femto base station 4*b*. Due to the decrease in the number of connected users, a change occurs in the used resources for the femto base station 4*b*, so at the operation BB, the femto base station 4*b* generates policy information and broadcasts it to the surroundings. The routine of the operation BB corresponds to operation performed by the femto cell information acquisition unit 43, policy generation unit 44, and policy communication unit 45 of the femto base station 4*b*.

At the operation BC, the femto base station 4*a* acquires the policy information and generates a trigger for starting the BH channel determination operation. The routine of the operation BC corresponds to operation performed by the policy communication unit 45 of the femto base station 4*a*.

At the operation BD, the femto base station 4*a* acquires information relating to the femto base station 4*a* and generates policy information. The routine of the operation BD corresponds to the operation performed by the femto cell information acquisition unit 43 and the policy generation unit 44 of the femto base station 4*a*.

At the operation BE, the femto base station 4*a* determines the BH channel which transmits the traffic of the mobile station 5*b*, in accordance with the information which is acquired at the operation BD and the policy information which is received from the femto base station 4*b* and/or mobile station 5*b*. In the present embodiment, for example, it selects an ad hoc channel 13*b* as the BH channel. The routine of the operation BE corresponds to operation performed by the channel determination unit 46 of the femto base station 4*a*.

At the operation BF, the femto base station 4*a* switches the BH channel, which transmits the traffic of the mobile station 5*b*, to the ad hoc channel 13*b*. After that, the femto base station 4*a* transmits the traffic of the mobile station 5*b* with the center office apparatus 2 through the ad hoc channel 13*b*. The routine of the operation BF corresponds to the operation performed by the channel determination unit 46, BH channel switching unit 47, and ad hoc communication unit 50 of the femto base station 4*a*.

As a result, for example, without using the usage-based charging type wireless channel 12b, the femto base station 4a can use the ad hoc channel 13b to transmit the traffic of the mobile station 5b.

Note that, in another operational example, at the operation BE, the fixed channel 11b or the wireless channel 12b may also be selected as the BH channel. In this way, the femto base station 4a can improve the communication throughput of the mobile station 5b since the femto base station 4a can select the BH channel to be used from among the plurality of channels with different throughputs.

Figure 10:
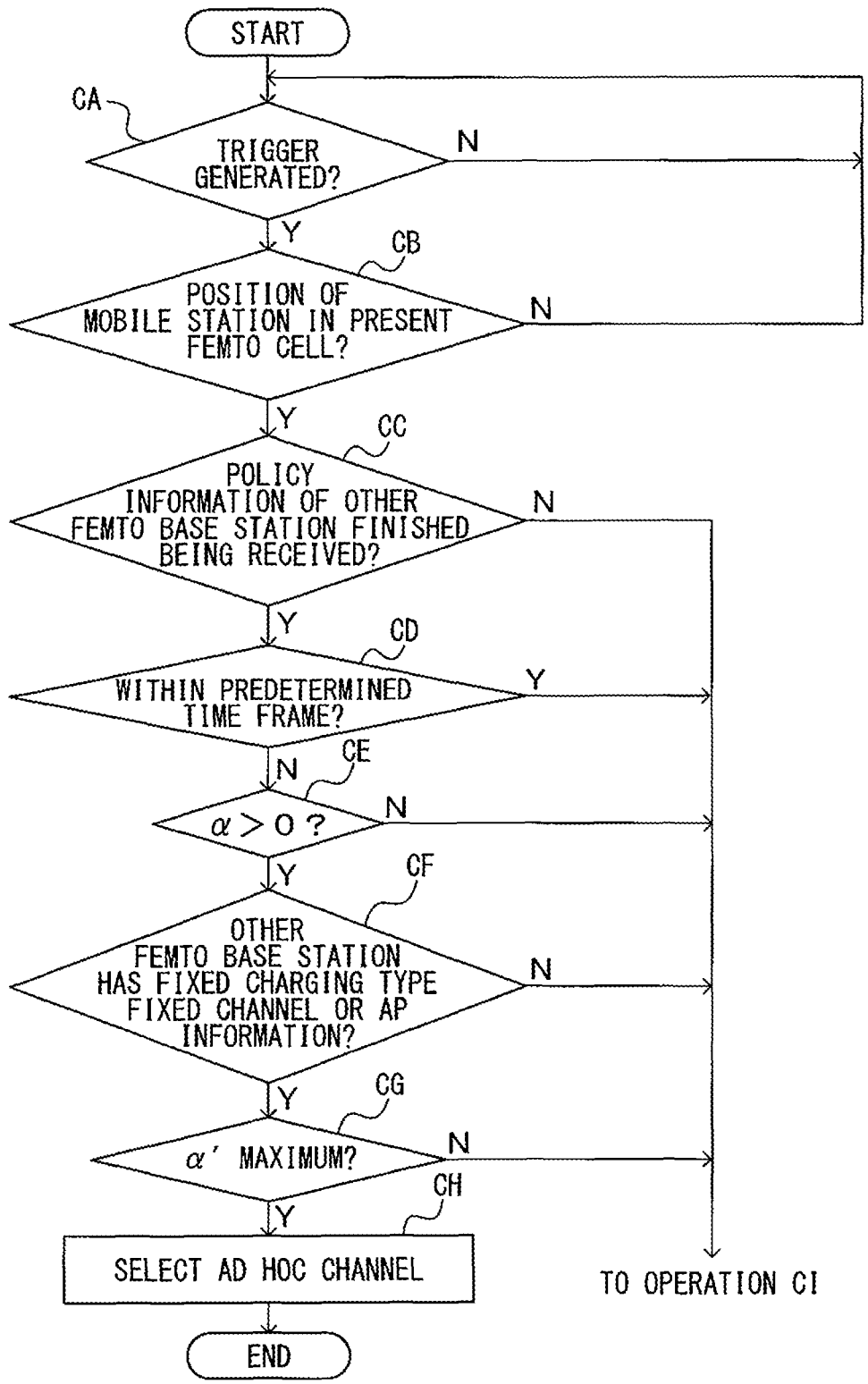
FIG. 10 is an explanatory view of a second example of a backhaul channel determination operation.
Figure 11:
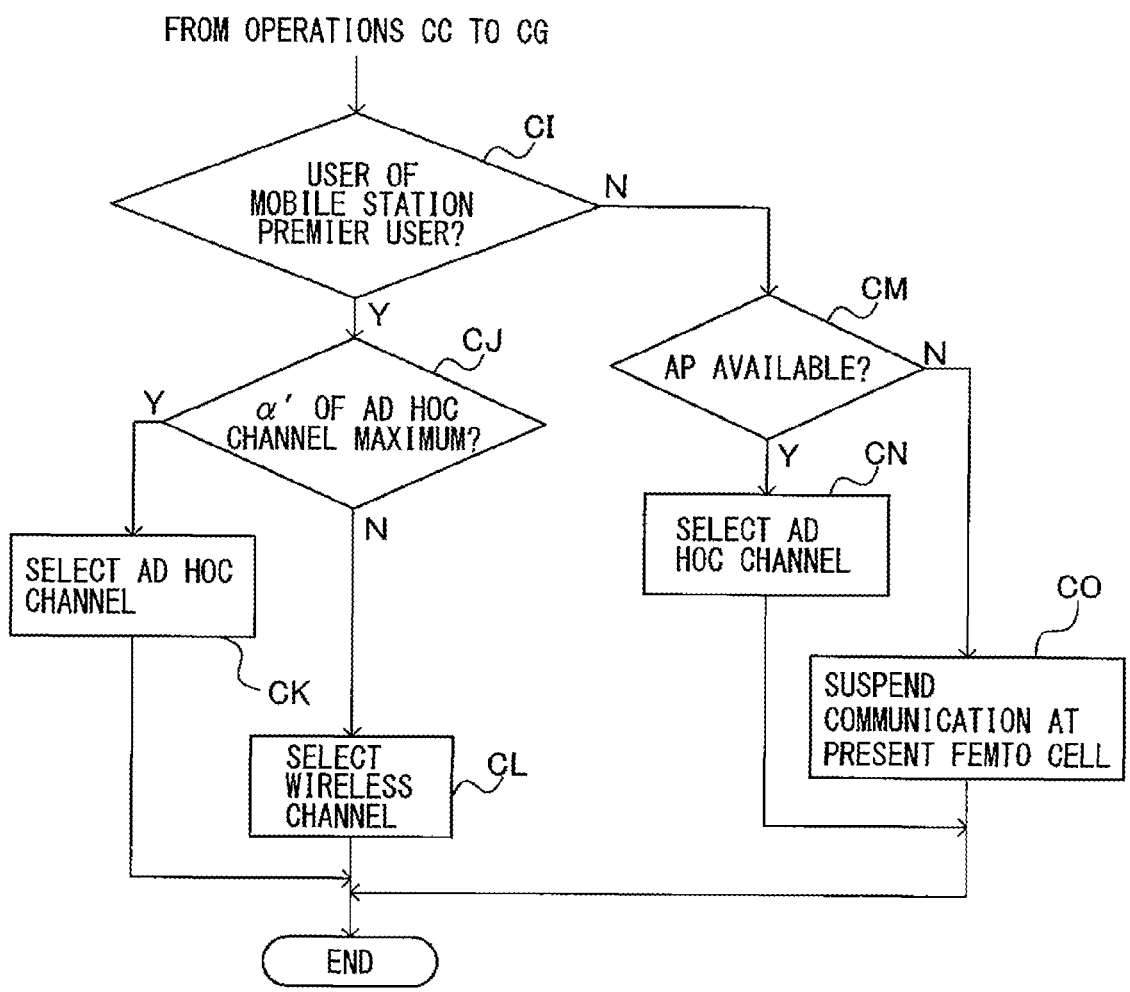
FIG. 11 is an explanatory view of a second example of a backhaul channel determination operation.

Next, a second example of the BH channel determination operation according to the femto base station 4 will be explained. FIG. 10 and FIG. 11 are explanatory views of a second example of a BH channel determination operation. The routine of FIG. 10 and FIG. 11 is an example of a BH channel determination operation at the femto base station 4 which can use the wireless channel 12 and ad hoc channel 13.

At the operation CA, the channel determination unit 46 judges if a trigger has been generated for starting the BH channel determination operation. If a trigger has been generated (operation CA: Y), the routine proceeds to the operation CB. When a trigger has not occurred (operation CA: N), the routine returns to the operation CA. In this case, the BH channel is not switched.

At the operation CB, the channel determination unit 46 judges if there is a mobile station 5 in the femto cell in which the femto base station 4 is positioned. If there is a mobile station 5 in the femto cell (operation CB: Y), the routine proceeds to the operation CC. If there is no mobile station 5 in the femto cell (operation CB: N), the routine turns to the operation CA. In this case, the BH channel is not switched.

At the operation CC, the channel determination unit 46 judges whether it has received policy information from another femto base station 4 through the ad hoc channel 13. If policy information from another femto base station 4 has been received (operation CC: Y), the routine proceeds to the operation CD. If policy information from another femto base station 4 has not been received (operation CC: N), the routine proceeds to the operation CI.

At the operation CD, the channel determination unit 46 judges if the current time is within a predetermined time frame. If the current time is within the predetermined time frame (operation CD: Y), the routine proceeds to the operation CI. If the current time is not within the predetermined time frame (operation CD: N), the routine proceeds to the operation CE.

At the operation CE, the channel determination unit 46 judges if the indicator α of the available resources for the other femto base station 4, which was calculated based on the policy information of the other femto base station 4, is larger than 0. If the indicator α is larger than 0 (operation CE: Y), the routine proceeds to the operation CF. If the indicator α is 0 (operation CE: N), the routine proceeds to the operation CI.

At the operation CF, the channel determination unit 46 judges if the other femto base station 4 has a fixed charging type fixed channel or AP information. If the other femto base station 4 has the fixed charging type fixed channel or AP information (operation CF: Y), the routine proceeds to the operation CG. If the other femto base station 4 does not have either of the fixed charging type fixed channel and AP information (operation CF: N), the routine proceeds to the operation CI.

At the operation CG, the channel determination unit 46 judges if the allocated throughput prediction indicator α' of the ad hoc channel 13 is the maximum one among the BH channels which the femto base station 4 can use. If the allocated throughput prediction indicator α' of the ad hoc channel 13 is the maximum (operation CG: Y), the routine proceeds to the operation CH. If the allocated throughput prediction indicator α' of the ad hoc channel 13 is not the maximum (operation CG: N), the routine proceeds to the operation CI.

At the operation CH, the channel determination unit 46 selects the ad hoc channel 13 as the BH channel. After that, the BH channel determination operation ends.

At the operation CI, the channel determination unit 46 judges if the user of the mobile station 5 is a premier user. If the user is a premier user (operation CI: Y), the routine proceeds to the operation CJ. If the user is not a premier user (operation CI: N), the routine proceeds to the operation CM.

At the operation CJ, the channel determination unit 46 judges if the allocated throughput prediction indicator α' of the ad hoc channel 13 is the maximum among the BH channels which the femto base station 4 can use. If the allocated throughput prediction indicator α' of the ad hoc channel 13 is the maximum (operation CJ: Y), the routine proceeds to the operation CK. If the allocated throughput prediction indicator α' of the ad hoc channel 13 is not the maximum (operation CJ: N), the routine proceeds to the operation CL.

At the operation CK, the channel determination unit 46 selects the ad hoc channel 13 as the BH channel. After that, the BH channel determination operation ends. At the operation CL, the channel determination unit 46 selects the wireless channel 12 as the BH channel. After that, the BH channel determination operation ends.

At the operation CM, the channel determination unit 46 judges if there is an AP which communicates directly with the femto base station 4 through the ad hoc channel 13. When there is an AP (operation CM: Y), the routine proceeds to the operation CN. When there is no AP (operation CM: N), the routine proceeds to the operation CO.

At the operation CN, the channel determination unit 46 selects the ad hoc channel 13 as the BH channel. After that, the BH channel determination operation ends. At the operation CO, the channel determination unit 46 suspends the communication with the mobile station 5 at the present femto base station 4. After that, the BH channel determination operation ends.

Figure 12:
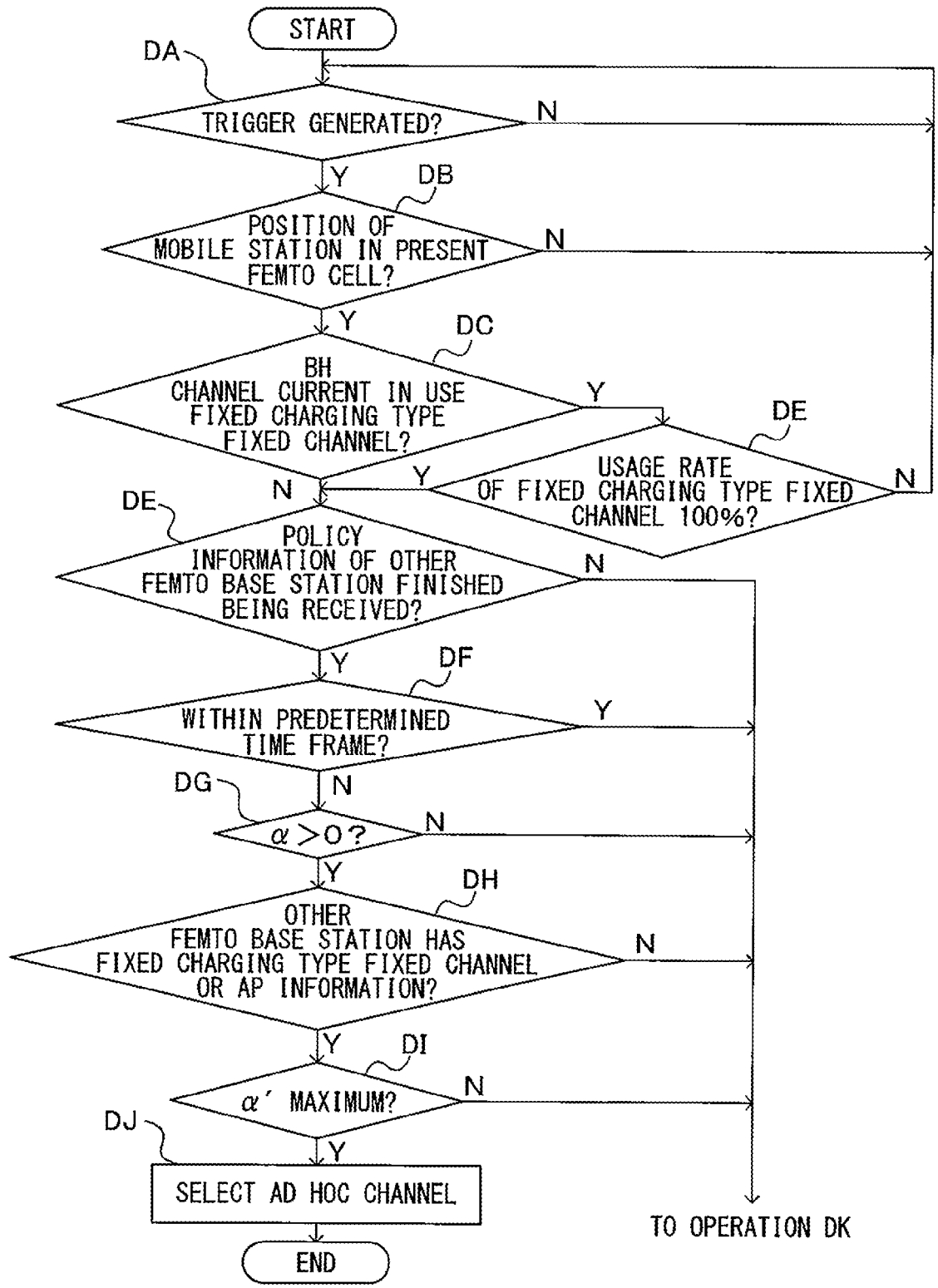
FIG. 12 is an explanatory view of a third example of a backhaul channel determination operation.
Figure 13:
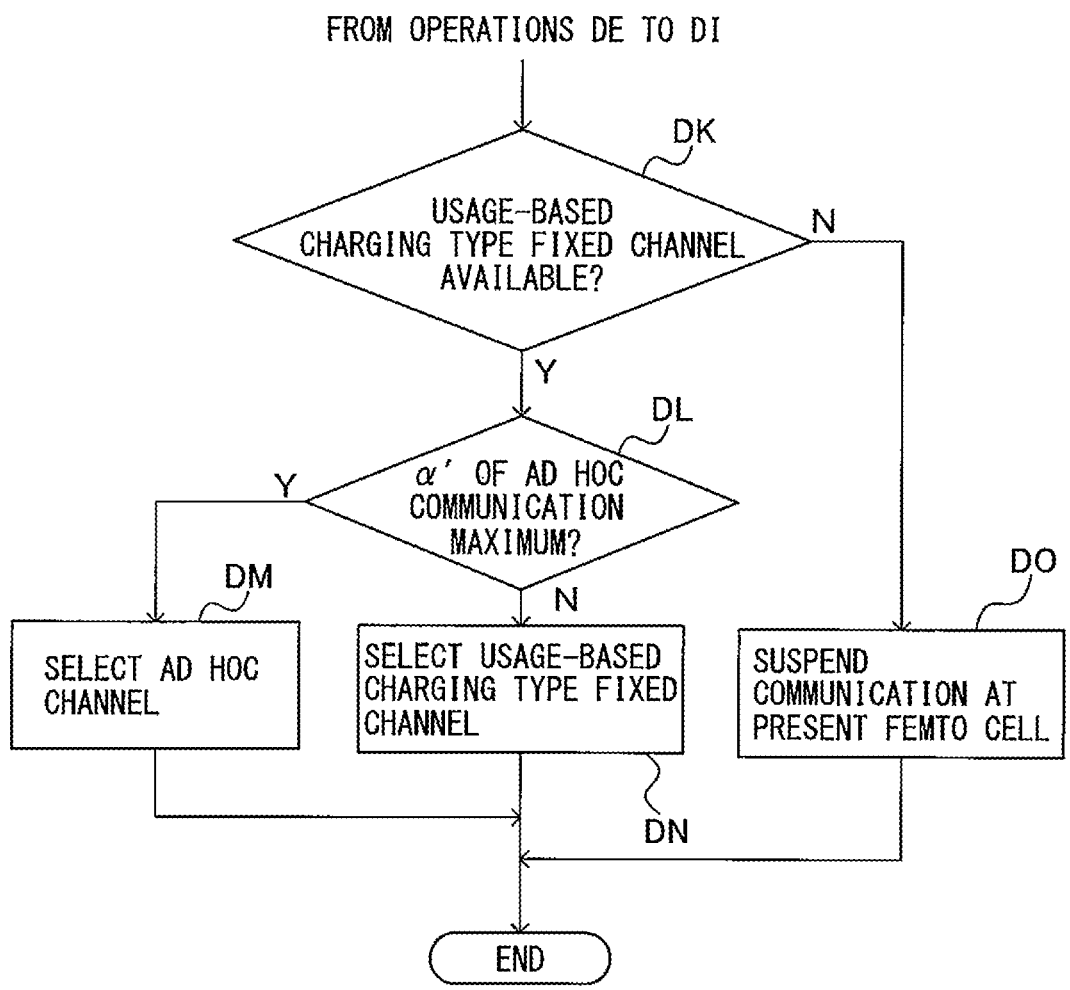
FIG. 13 is an explanatory view of a third example of a backhaul channel determination operation.

Next, a third example of a BH channel determination operation by the femto base station 4 will be explained. FIG. 12 and FIG. 13 are explanatory views of the third example of the BH channel determination operation. The routine of FIG. 12 and FIG. 13 is an example of a BH channel determination operation at a femto base station 4 which can use a fixed channel 11 and ad hoc channel 13.

The routine of the operations DA to DJ is similar to the routine of the operations AA to AJ which were explained with reference to FIG. 6 and FIG. 7. However, at the judgment of the operation DE, when policy information has not finished being received from another femto base station 4 (operation DE: N), the routine proceeds to the operation DK. Further, at the judgment of the operation DF, when the current time is within a predetermined time frame (operation DF: Y), the routine proceeds to the operation DK.

When at the judgment at the operation DG, the indicator α of the available resources for the femto base station 4 is 0 (operation DG: N), the routine proceeds to the operation DK. When at the judgment of operation DH, the other femto base station 4 does not have either of a fixed charging type fixed channel and AP information (operation DH: N), the routine proceeds to the operation DK. When at the judgment of the operation DI, the allocated throughput prediction indicator α' of the ad hoc channel 13 is not the maximum (operation DI: N), the routine proceeds to the operation DK.

At the operation DK, the channel determination unit 46 judges if there is a usage-based charging type fixed channel which can be used as the BH channel. When there is the usage-based charging type fixed channel which can be used as the BH channel (operation DK: Y), the routine proceeds to the operation DL. When there is no usage-based charging type fixed channel which can be used as the BH channel (operation AK: N), the routine proceeds to the operation DO.

At the operation DL, the channel determination unit 46 judges if the allocated throughput prediction indicator α' of the ad hoc channel 13 is the maximum among the BH channels which the femto base station 4 can use. If the allocated throughput prediction indicator α' of the ad hoc channel 13 is the maximum (operation DL: Y), the routine proceeds to the operation DM. If the allocated throughput prediction indicator α' of the ad hoc channel 13 is not the maximum (operation DL: N), the routine proceeds to the operation DN.

At the operation DM, the channel determination unit 46 selects the ad hoc channel 13 as the BH channel. After that, the BH channel determination operation ends. At the operation DN, the channel determination unit 46 selects the usage-based charging type fixed channel as the BH channel. After that, the BH channel determination operation ends. At the operation DO, the channel determination unit 46 suspends communication with the mobile station 5 at the present femto base station 4. After that, the BH channel determination operation ends.

3.2. Wireless Access Channel Determination Operation

Next, one example of a wireless access channel determination operation by the femto base station 4 will be explained. The channel determination unit 46 determines the wireless access channel between the femto base station 4 and the mobile station 5, based on the information included in the policy information which the policy generation unit 44 generated and/or the policy information received from the mobile station 5.

At this wireless access channel determination operation, the channel determination unit 46 may, for example, determine an indicator, which predicts the throughput which can be allocated to a wireless access channel, for each wireless access channel as an "allocated throughput prediction indicator". The channel determination unit 46 may determine the allocated throughput prediction indicator β in accordance with, for example, the following formula (3).

β=Effective throughput of wireless access channel×
(Allowable maximum number of users of present femto base station 4−Current number of connected users of present femto base station 4)/(Allowable maximum number of users of present femto base station 4)  (3)

Figure 14:
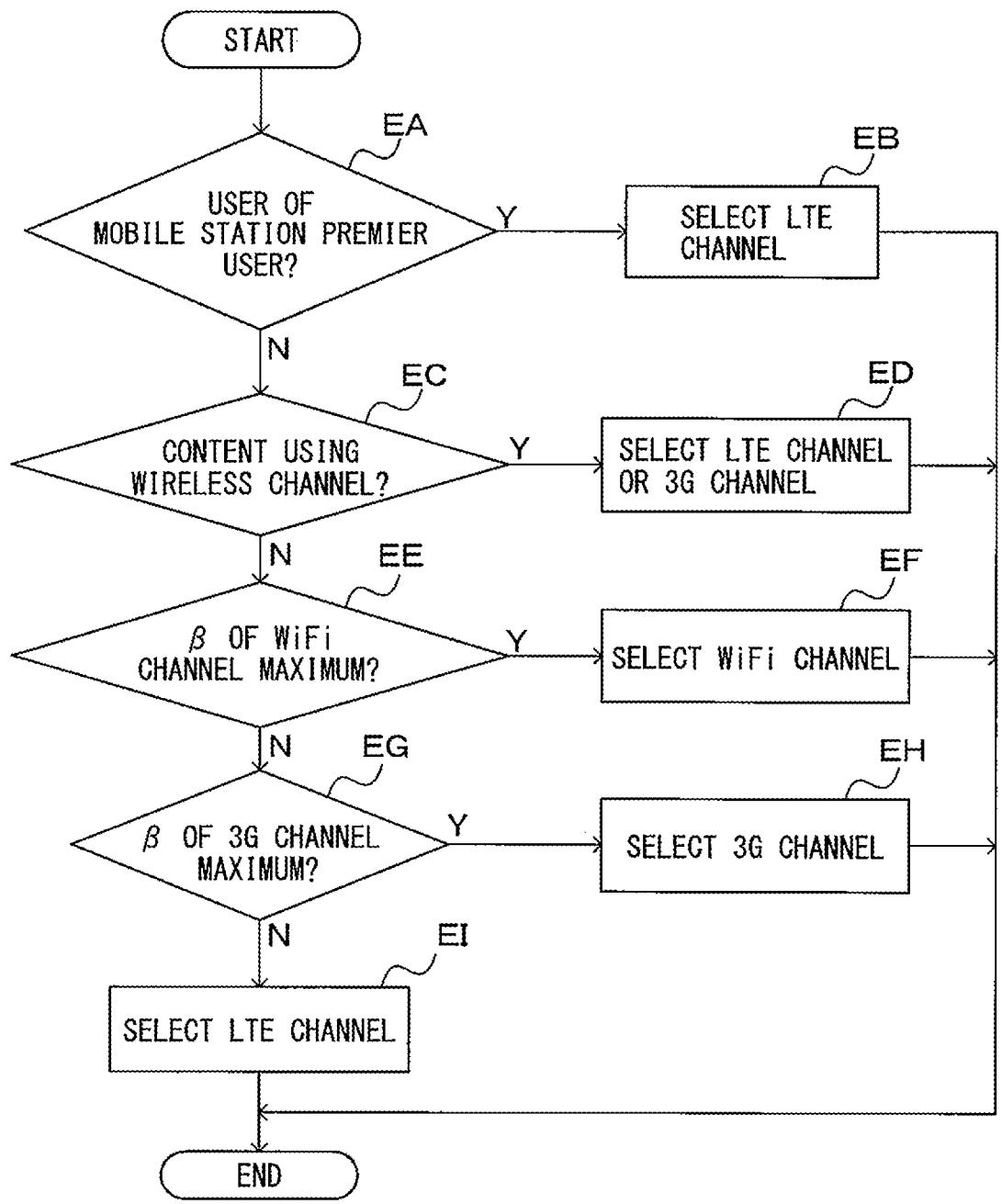
FIG. 14 is an explanatory view of one example of a wireless access channel determination operation.

The channel determination unit 46 determines the wireless access channel between the femto base station 4 and the mobile station 5 according to a predetermined policy. FIG. 14 is an explanatory view of one example of a wireless access channel determination operation.

At the operation EA, the channel determination unit 46 judges if the user of the mobile station 5 is a premier user. When the user is a premier user (operation EA: Y), the routine proceeds to the operation EB. When the user is not the premier user (operation EA: N), the routine proceeds to the operation EC.

At the operation EB, the channel determination unit 46 determines a wireless channel as a used channel which can be expected, in view of specifications, as a wireless channel having a relatively high throughput, among wireless channels based on a plurality of mobile communication wireless access systems which can be used between the mobile station 5 and femto base station 4. After that, the wireless access channel determination operation ends.

At the operation EC, the channel determination unit 46 judges if the content, which the mobile station 5 transmits and/or receives, is content which uses the wireless channel 12, based on the application information for transmitting and/or receiving traffic. When the content, which the mobile station 5 transmits and/or receives, is content which uses the wireless channel 12 (operation EC: Y), the routine proceeds to the operation ED. When the content, which the mobile station 5 transmits and/or receives, is not the content which uses the wireless channel 12 (operation EC: N), the routine proceeds to the operation EE.

At the operation ED, the channel determination unit 46 determines either of the 3G channel and LTE channel of wireless channels of a plurality of mobile communication wireless access systems, which can be used between a mobile station 5 and femto base station 4, as the used channel. After that, the wireless access channel determination operation ends.

At the operation EE, the channel determination unit 46 judges if the allocated throughput prediction indicator β of the WiFi channel is the maximum among the wireless access channels which the femto base station 4 can use. When the allocated throughput prediction indicator β of the WiFi channel is the maximum (operation EE: Y), the routine proceeds to the operation EF. When the allocated throughput prediction indicator β of the WiFi channel is not the maximum (operation EE: N), the routine proceeds to the operation EG.

At the operation EF, the channel determination unit 46 determines the WiFi channel as the wireless access channel between the mobile station 5 and the femto base station 4. After that, the wireless access channel determination operation ends.

At the operation EG, the channel determination unit 46 judges if the allocated throughput prediction indicator β of the 3G channel is the maximum among the wireless access channels which the femto base station 4 can use. If the allocated throughput prediction indicator β of the 3G channel is the maximum (operation EG: Y), the routine proceeds to the operation EH. If the allocated throughput prediction indicator β of the 3G channel is not the maximum (operation EG: N), the routine proceeds to the operation EI.

At the operation EH, the channel determination unit 46 determines the 3G channel as the wireless access channel between the mobile station 5 and the femto base station 4. After that, the wireless access channel determination operation ends. At the operation EI, the channel determination unit 46 determines the LTE channel as the wireless access channel between the mobile station 5 and the femto base station 4. After that, the wireless access channel determination operation ends.

Figure 15:
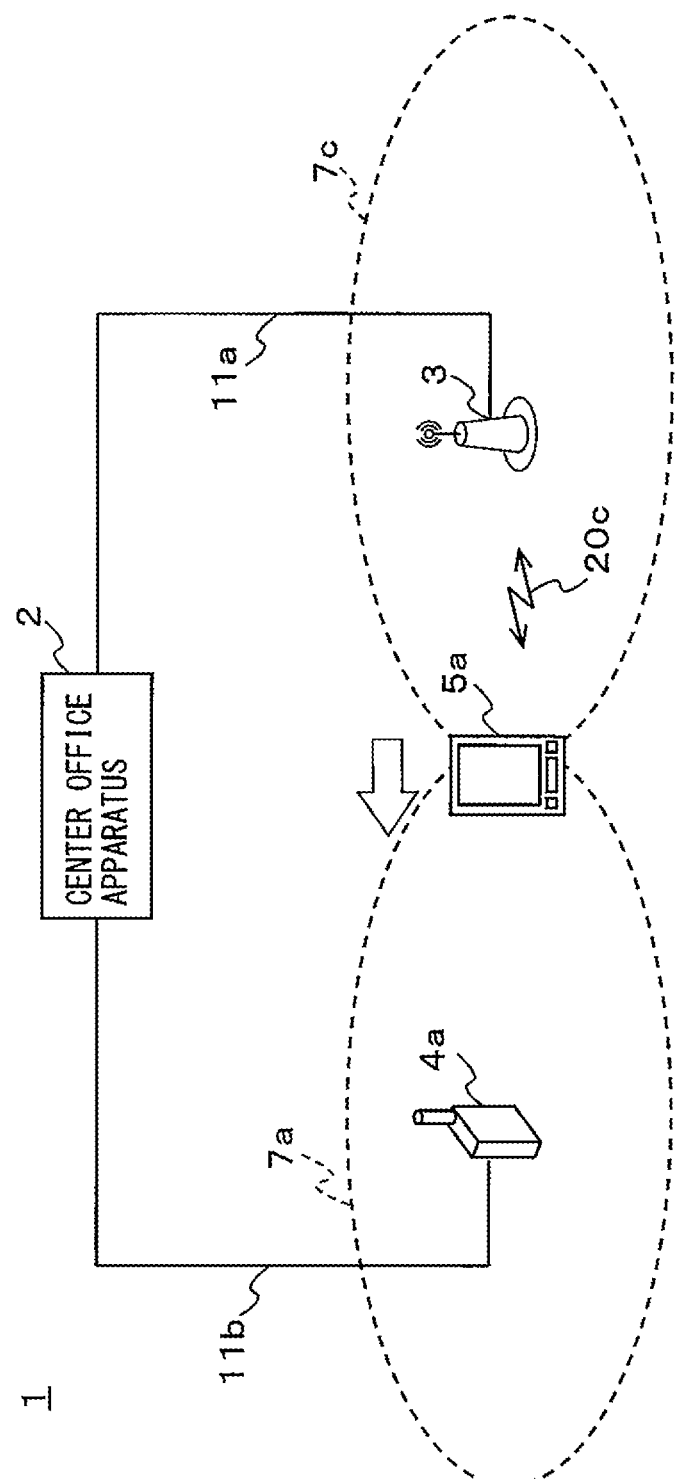
FIG. 15 is a schematic view of one example of the state of a wireless access channel determination operation being performed.
Figure 16:
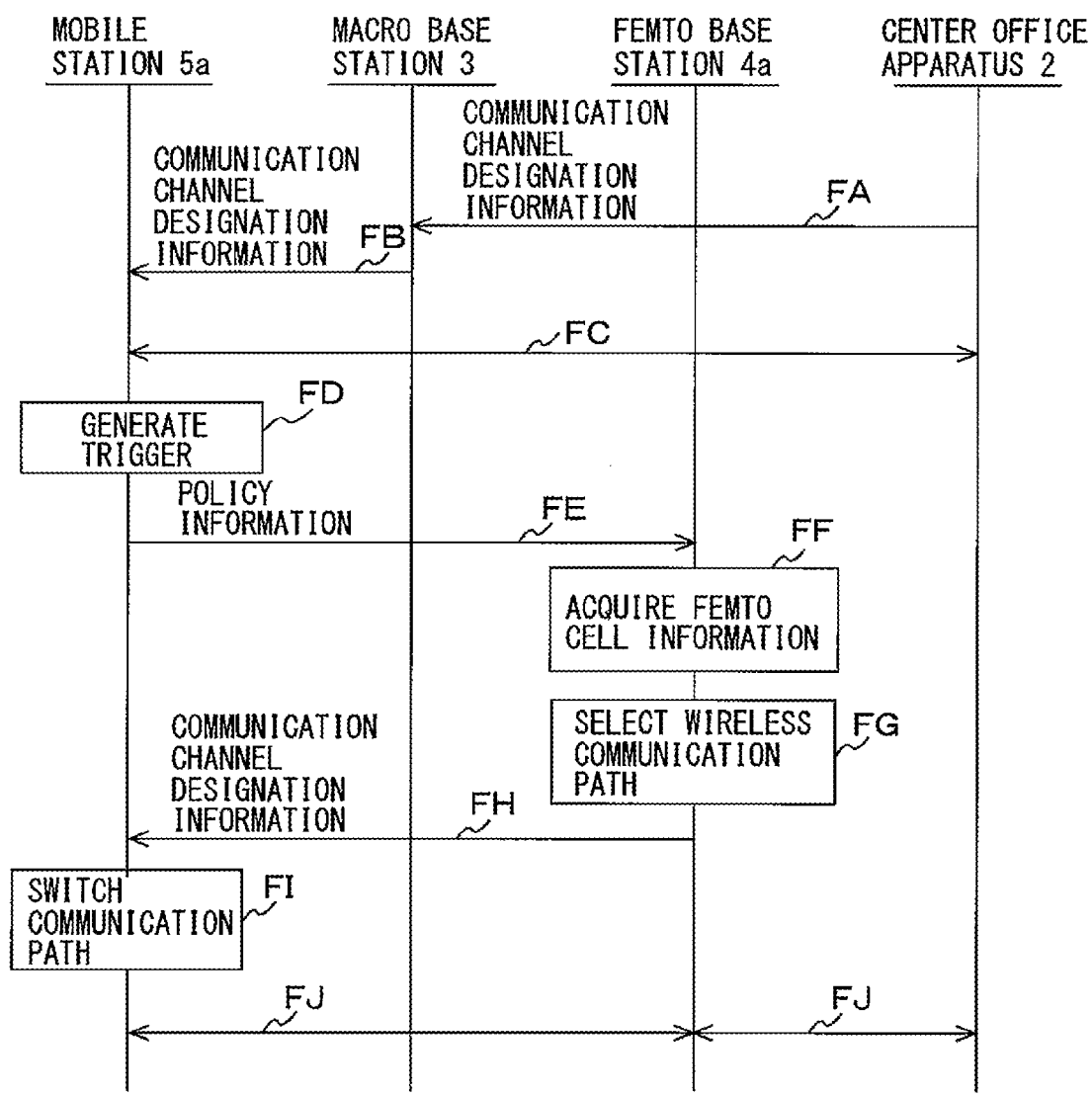
FIG. 16 is an explanatory view of one example of a sequence of a wireless access channel determination operation.

Next, the sequence of the wireless access channel determination operation will be explained. FIG. 15 is a schematic view of one example of the state where the wireless access channel determination operation is performed. FIG. 16 is an explanatory view of one example of the sequence of the wireless access channel determination operation.

Now, envision the case where there is a mobile station 5*a* in a macro cell 7*c* which the macro base station 3 forms.

Further, at the operation FA, the center office apparatus 2 transmits the communication channel designation information, which designates the used communication channel of the mobile station 5a in the macro cell 7c, to the mobile station 5a. The routine of the operation FA corresponds to operations performed by the traffic information acquisition unit 34, policy generation unit 35, policy communication unit 36, and fixed channel IF unit 32 of the center office apparatus 2.

At the operation FB, the mobile station 5a receives the communication channel designation information via the macro base station 3. The routine of the operation FB corresponds to operations performed by the fixed channel communication unit 60 and wireless processing unit 61 of the macro base station 3 and the wireless processing unit 71 and policy communication unit 74 of the mobile station 5.

At the operation FC, the mobile station 5a communicates by the communication channel which is set by the communication channel designation information. The routine of the operation FC corresponds to operation performed by the wireless processing unit 71 and communication channel control unit 70 of the mobile station 5.

If the mobile station 5a moves to the inside of the femto cell 7a which the femto base station 4a forms, the base station, with which the mobile station 5a connects, changes to the femto base station 4a, so at the operation FD, a trigger is generated at the mobile station 5a and policy information is generated thereby.

At the operation FE, the mobile station 5a generates policy information and transmits it to the femto base station 4a. The routine of the operation FE corresponds to the operation performed by the mobile station information acquisition unit 72, policy generation unit 73, and policy communication unit 74 of the mobile station 5a.

At the operation FF, when the femto base station 4a acquires the policy information, a trigger is generated which starts the wireless access channel determination operation. The femto base station 4a acquires information relating to the femto base station 4a and generates policy information. The routine of the operation FF corresponds to the operation performed by the femto cell information acquisition unit 43 and policy generation unit 44 of the femto base station 4a.

At the operation FG, the femto base station 4a determines the wireless access channel between the mobile station 5a and the femto base station 4a in accordance with the information which was acquired at the operation FF and/or policy information which was received from the mobile station 5a. The routine of the operation FG corresponds to operation of the channel determination unit 46 of the femto base station 4a.

At the operation FH, the femto base station 4a transmits the communication channel designation information to the mobile station 5, which designates the determined wireless access channel. The routine of the operation FH corresponds to the operation performed by the policy generation unit 44 and the policy communication unit 45 of the femto base station 4a. At the operation FI, the mobile station 5a switches the wireless access channel which is used for communication with the femto base station 4a to a channel which is designated by the communication channel designation information. The routine of the operation FI corresponds to operation performed by the wireless processing unit 71 and communication channel control unit 70 of the mobile station 5.

At the operation FJ, the mobile station 5a communicates through the communication channel which is set by the communication channel designation information. The routine of the operation FC corresponds to operation performed by the wireless processing unit 71 and communication channel control unit 70 of the mobile station 5.

In the above explanation, the views of the functional configuration of FIG. 2 to FIG. 5 show primarily the configurations relating to the functions which are explained in the Description. The center office apparatus 2, macro base station 3, femto base station 4, and mobile station 5 may also include other component elements other than the illustrated component elements. The series of operations which are explained with reference to FIG. 6, FIG. 7, FIG. 9 to FIG. 14, and FIG. 16 may also be interpreted as a method including a plurality of routines. In this case, "operation" may be read as "step".

4. Effects of Embodiment

According to the present embodiment, the efficiency of communication between the femto base station 4 and its upper layer apparatus, that is, the center office apparatus 2, is improved. For example, by selecting the BH channel to be used in accordance with the state of the femto base station 4 or other femto base station, it becomes possible to use a channel with a better efficiency of communication for communication of the femto base station 4 and the center office apparatus 2.

Further, by limiting the conditions for use of a specific BH channel, it is possible to lighten the load on the specific BH channel. By lightening the load of the specific BH channel, for example, it is possible to reduce the load of the channels which the mobile communication carrier manages and reduce the load of the mobile communication carrier. Further, for example, by limiting the condition for using a usage-based charging type channel, for example the cost of communication is reduced.

According to the present embodiment, the efficiency of communication between the femto base station 4 and the mobile station 5 is improved. For example, by selecting the wireless access channel to be used in accordance with the state of the femto base station 4 or mobile station 5, it becomes possible for the femto base station 4 and the mobile station 5 to communicate using a channel with a better efficiency of communication. Further, by using the user information or application information of the mobile station 5 to select the wireless access channel, it is possible to realize more diverse communication services to provide to the users.

Further, according to the present embodiment, the function of determining the BH channel and the function of determining the wireless access channel are dispersed to the femto base stations 4, so the load of the center office apparatus 2 is reduced compared with a configuration which arranges the ANDSF servers concentrated at the center office apparatus 2. Further, it is possible to quickly determine the BH channel and wireless access channel in accordance with changes in state of the femto base station 4 or mobile station 5.

5. Modifications

Note that, the channel determination unit 46 may select a plurality of BH channels for transmitting traffic of the same mobile station 5 simultaneously in parallel. The BH communication unit 41 may transmit traffic of the same mobile station 5 simultaneously in parallel by link aggregation through the plurality of BH channels which are selected by the channel determination unit 46.

Further, the channel determination unit 46 may select a plurality of wireless access channels for simultaneously communicating with the same mobile station 5 in parallel. The wireless communication unit 42 may simultaneously communicate with the same mobile station 5 in parallel by link aggregation through a plurality of wireless access channels which have been selected by the channel determination unit 46.

6. Hardware Configuration

Figure 17:
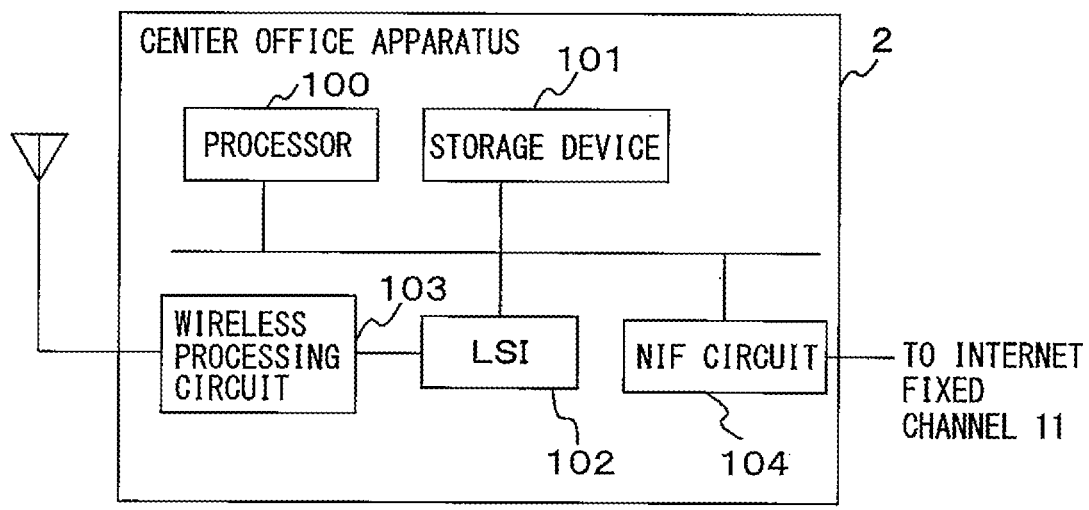
FIG. 17 is a view of a hardware configuration of one example of a center office apparatus.

Below, an example of the hardware configuration of component elements of the mobile communication system 1 will be explained. FIG. 17 is a view of the hardware configuration of one example of the center office apparatus 2. The center office apparatus 2 comprises a processor 100, storage device 101, LSI (large scale integrated circuit) 102, wireless processing circuit 103, and network interface circuit 104. In the following explanation and attached drawings, the network interface will sometimes be indicated as "NIF".

The storage device 101 may include devices for storing computer programs or data such as a nonvolatile memory, read only memory (ROM), random access memory (RAM), hard disk drive device, etc. The processor 100 controls the operation of the center office apparatus 2 in accordance with a computer program which is stored in the storage device 101.

The LSI 102 performs processing of a signal, according to the mobile communication wireless access system between the center office apparatus 2 and femto base station 4, such as encoding and modulation and demodulation and decoding, processing of the communication protocol, and processing of the baseband signal relating to scheduling. The LSI 102 may also include an FPGA (Field-Programming Gate Array), ASIC (Application Specific Integrated Circuit), DSP (Digital Signal Processing), etc.

The wireless processing circuit 103 may include a digital-analog conversion circuit, analog-digital conversion circuit, frequency conversion circuit, amplification circuit, filter circuit, etc. The NIF circuit 104 is provided with an electronic circuit for performing the processing of a physical layer and data link layer for communication through the fixed channel 11.

The above operation of the communication channel determination unit 30, which is illustrated in FIG. 2, may be executed by the processor 100. The above operation of the CN unit 31 may be executed by coordinated operation of the processor 100 and NIF circuit 104. The above operation of the fixed channel IF unit 32 may be executed by the NIF circuit 104. The above operation of the wireless processing unit 33 may be executed by coordinated operation of the LSI 102 and the wireless processing circuit 103.

Figure 18:
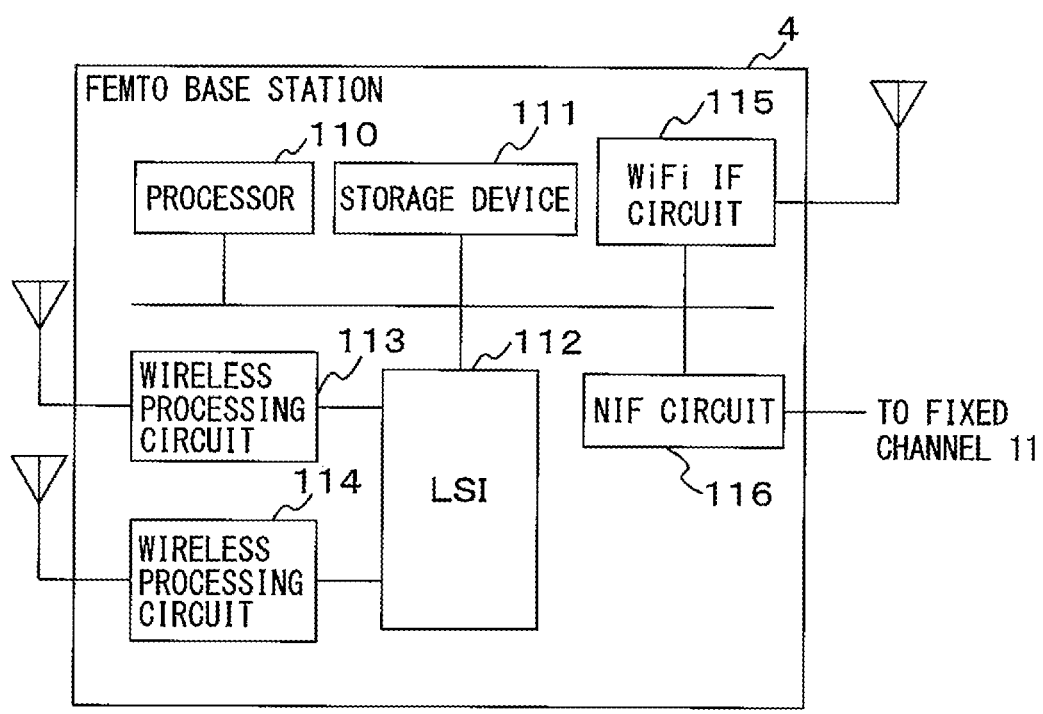
FIG. 18 is a view of a hardware configuration of one example of a femto base station apparatus.

FIG. 18 is a view of the hardware configuration of a femto base station 4. The femto base station 4 comprises a processor 110, storage device 111, LSI 112, wireless processing circuits 113 and 114, WiFi IF circuit 115, and NIF circuit 116.

The storage device 111 may contain devices for storing computer programs and data, such as a nonvolatile memory, read only memory, random access memory, hard disk drive device, etc. The processor 110 performs the operational control of the femto base station 4 in accordance with a computer program which is stored in the storage device 111.

The LSI 112 performs signal processing in accordance with the mobile communication wireless access system of the wireless channel 12, between the center office apparatus 2 and femto base station 4, and wireless access channel between the femto base station 4 and the mobile station 5. The signal processing includes encoding and modulation and demodulation and decoding, processing of the communication protocol, and processing of the baseband signal relating to scheduling. The LSI 112 may also include an FPGA, ASIC, DSP, etc.

The wireless processing circuits 113 and 114 may include digital-analog conversion circuits, analog-digital conversion circuits, frequency conversion circuits, amplification circuits, filter circuits, etc. The WiFi IF circuit 115 performs signal processing for transmitting and receiving the signal for WiFi based on communication control rules. The NIF circuit 116 is provided with electronic circuits for processing the physical layer and data link layer for communication through the fixed channel 11.

The above operations of the communication channel determination unit 40, BH channel switching unit 47, and wireless switching unit 51, which are illustrated in FIG. 3, may be executed by the processor 110. The above operation of the fixed channel communication unit 48 may be executed by an NIF circuit 116. The above operation of the mobile communication unit 49 may be executed by cooperation of the LSI 112 and the wireless processing circuit 113. The operations of the ad hoc communication unit 50 and WiFi communication unit 54 may be executed by the WiFi IF circuit 115. The above operations of the 3G communication unit 52 and LTE communication unit 53 may be executed by cooperation of the LSI 112 and the wireless processing circuit 114.

Figure 19:
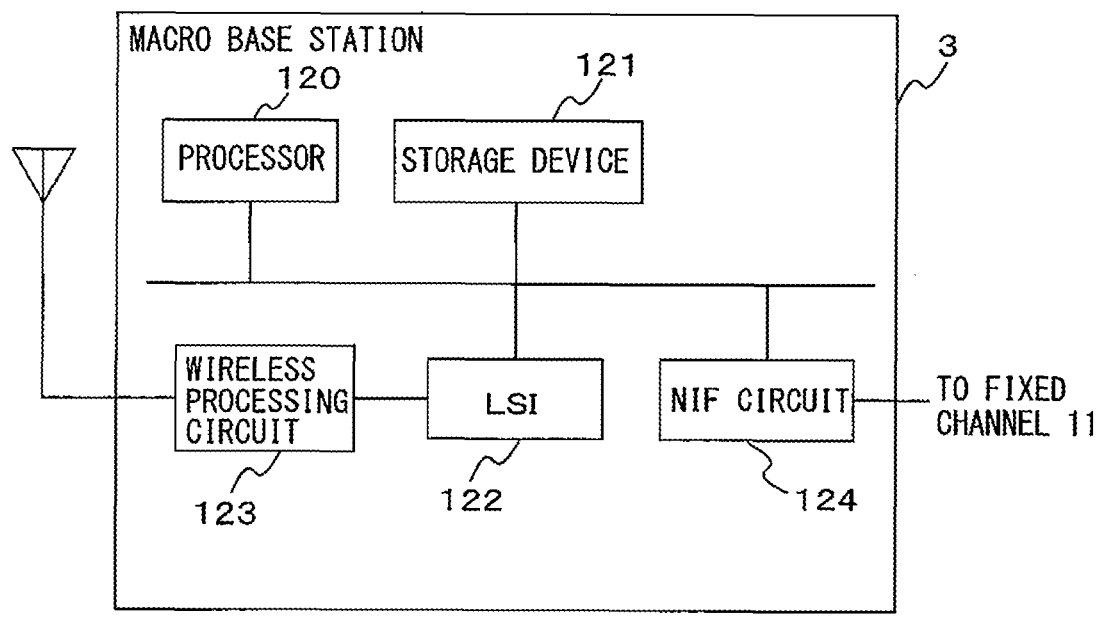
FIG. 19 is a view of a hardware configuration of one example of a macro base station apparatus.

FIG. 19 is a view of the hardware configuration of one example of a macro base station 3. The macro base station 3 comprises a processor 120, storage device 121, LSI 122, wireless processing circuit 123, and NIF circuit 124.

The storage device 121 may include a device for storing computer programs or data, such as a nonvolatile memory, read only memory, random access memory, hard disk drive device, etc. The processor 120 controls the operation of the macro base station 3 in accordance with a computer program which is stored in the storage device 121.

The LSI 122 encodes and modulates and demodulates and decodes a signal according to the mobile communication wireless access system of the communication channel between the macro base station 3 and the mobile station 5, the processing of the communication protocol, and the processing of the baseband signal relating to scheduling. The LSI 122 may also include a FPGA, ASIC, DSP, etc.

The wireless processing circuit 123 may include a digital-analog conversion circuit, analog-digital conversion circuit, frequency conversion circuit, amplification circuit, filter circuit, etc. The NIF circuit 124 is provided with an electronic circuit for performing the processing of a physical layer and data link layer for communication through the fixed channel 11.

The above operation of the fixed channel communication unit 60, which is illustrated in FIG. 4, may be executed by the NIF circuit 124. The above operation of the wireless processing unit 61 may be executed by cooperation of the LSI 122 and the wireless processing circuit 123.

Figure 20:
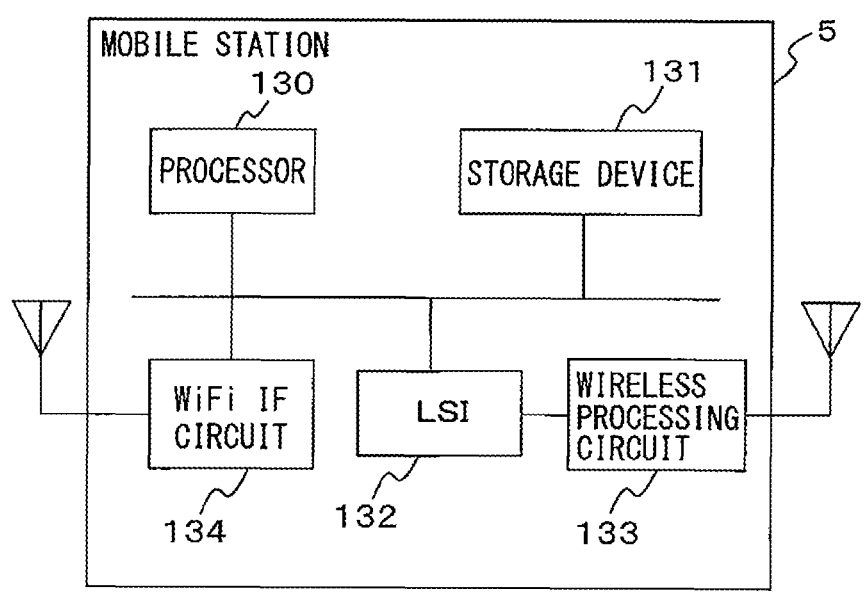
FIG. 20 is a view of a hardware configuration of one example of a mobile station apparatus.

FIG. 20 is a view of the hardware configuration of one example of a mobile station 5. A mobile station 5 is comprised of a processor 130, storage device 131, LSI 132, wireless processing circuit 133, and WiFi IF circuit 134.

The storage device 131 may include a device for storing computer programs or data, such as a nonvolatile memory, read only memory, random access memory, hard disk drive device, etc. The processor 130 controls the operation of the mobile station 5 in accordance with a computer program which is stored in the storage device 131.

The LSI 132 performs signal processing in accordance with the mobile communication wireless access system of the wireless access channel between the macro base station 3 and the mobile station 5 and between the femto base station 4 and the mobile station 5. The signal processing includes encoding and modulation and demodulation and decoding, processing of the communication protocol, and processing of the baseband signal relating to scheduling. The LSI 132 may also include an FPGA, ASIC, DSP, etc.

The wireless processing circuit 133 may include a digital-analog conversion circuit, analog-digital conversion circuit, frequency conversion circuit, amplification circuit, filter circuit, etc. The WiFi IF circuit 134 performs signal processing for transmitting and receiving the signal for WiFi based on communication control standards.

The above operation of the communication channel control unit 70, which is illustrated in FIG. 5, may be executed by the processor 130. The above operation of the wireless processing unit 71 may be executed by coordinated operation of the LSI 132 and the wireless processing circuit 133 and the WiFi IF circuit 134.

Note that, the hardware configuration which is illustrated in FIG. 17 to FIG. 20 is nothing more than an illustration for explaining the embodiments. If performing the above operation, the center office apparatus 2, macro base station 3, femto base station 4, and mobile station 5 which are described in the Description may also employ any other hardware configurations.

All examples and conditional language recited hereinafter are intended for pedagogical purposes to aid the reader in understanding the principles of the invention and the concepts contributed by the inventor to furthering the art and are to be construed as being without limitation to such specifically recited examples and conditions. Nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

REFERENCE SIGNS LIST 1. mobile communication system
2. center office apparatus
3. macro base station
4 and 4*a* to 4*c*. femto base stations
5 and 5*a* to 5*e*. mobile stations
6*a*. AP

What is claimed is:

1. A base station apparatus comprising:
   a plurality of communication circuits which communicate with an upper layer apparatus of said base station apparatus and/or a second base station apparatus which can communicate with said base station apparatus through a different plurality of backhaul channels which include at least two of a fixed channel, a wireless channel based on a mobile communication wireless access system and an ad hoc channel;
   a base station information acquisition circuit which acquires base station information relating to the state of said base station apparatus and the state of the second base station apparatus;
   a channel selector which selects any of said plurality of backhaul channels in accordance with said base station information; and
   a channel switch which dynamically switches a backhaul channel which is used for transmission of traffic of a mobile station apparatus to a backhaul channel which is selected by said channel selector.

2. The base station apparatus according to claim 1, wherein
   the apparatus is further comprised of a base station apparatus detector which detects a second base station apparatus which can communicate with said base station apparatus through any backhaul channel of said plurality of backhaul channels, and
   said channel selector selects said any backhaul channel in accordance with the results of detection of said second base station apparatus.

3. The base station apparatus according to claim 1, wherein
   the apparatus is further comprised of a second base station information acquisition circuit which acquires second base station information relating to the state of a second base station apparatus which enables a communication with said base station apparatus through any backhaul channel of said plurality of backhaul channels, and
   said channel selector selects any of said plurality of backhaul channels in accordance with said base station information and/or said second base station information.

4. The base station apparatus according to claim 3, wherein said channel selector selects said any backhaul channel in accordance with said second base station information.

5. The base station apparatus according to claim 1, wherein
   said channel selector selects a different plurality of backhaul channels which are selected from said plurality of backhaul channels, and
   the plurality of backhaul channels, which said channel selector selects, transmits the traffic of the same mobile station apparatus in parallel.

6. The base station apparatus according to claim 1, further comprising:
   a plurality of second communication circuits which respectively communicate with mobile station apparatuses through a different plurality of wireless backhaul channels;
   a mobile station information acquisition circuit which acquires mobile station information which relates to the state of said mobile station apparatus;
   a second channel selector which selects any of said plurality of wireless communication channels in accordance with said base station information and/or said mobile station information; and
   a second channel switch which dynamically switches a wireless communication channel which is used for communication with said mobile station apparatus and selected by said second channel selector.

7. The base station apparatus according to claim 6, wherein said mobile station information includes information relating to a user of said mobile station apparatus or information relating to an application being run by said mobile station apparatus.

8. The base station apparatus according to claim 6, further comprising a transmitter which transmits channel designation information which designates the wireless communication channel selected by said second channel selector to said mobile station apparatus.

9. The base station apparatus according to claim 6, wherein
said second channel selector selects a different plurality of channels which are selected from said plurality of wireless communication channels, and
the selected plurality of channels are used to communicate with the same mobile station apparatus in parallel.

10. The base station apparatus according to claim 6, wherein said plurality of wireless communication channels include at least two of the wireless channels based on the mobile communication wireless access system and wireless channels based on systems other than the mobile communication wireless access system.

11. A channel switching method of a base station apparatus comprising:

acquiring, using a processor, base station information which relates to the state of said base station apparatus and the state of a second base station apparatus, wherein said base station apparatus communicates with an upper layer apparatus of said base station apparatus and/or the second base station apparatus which enables a communication with said base station apparatus through a different plurality of backhaul channels which include at least two of a fixed channel, a wireless channel based on a mobile communication wireless access system and an ad hoc channel;

selecting, using the processor, any backhaul channel among the backhaul channels in accordance with said base station information; and dynamically switching, using the processor, the backhaul channel which is used for transmission of traffic of a mobile station apparatus to the selected any of the backhaul channels by the selecting.

* * * * *